United States Patent
Jordan et al.

(10) Patent No.: US 7,203,828 B2
(45) Date of Patent: Apr. 10, 2007

(54) USE OF NAND FLASH FOR HIDDEN MEMORY BLOCKS TO STORE AN OPERATING SYSTEM PROGRAM

(75) Inventors: Marc Kevin Jordan, Austin, TX (US); Antonio Torrini, Austin, TX (US); Jean Charles Pina, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 410 days.

(21) Appl. No.: 10/723,909

(22) Filed: Nov. 26, 2003

(65) Prior Publication Data

US 2004/0133734 A1 Jul. 8, 2004

Related U.S. Application Data

(60) Provisional application No. 60/429,941, filed on Nov. 29, 2002.

(51) Int. Cl.
*G06F 9/24* (2006.01)
*G06F 12/16* (2006.01)

(52) U.S. Cl. .............. 713/1; 714/1; 711/154; 711/162

(58) Field of Classification Search .............. None
See application file for complete search history.

(56) References Cited

U.S. PATENT DOCUMENTS 6,901,493 B1 * 5/2005 Maffezzoni ............ 711/162
7,009,896 B2 * 3/2006 Yoon et al. ............ 365/200

FOREIGN PATENT DOCUMENTS

JP         2004127040 A  *  4/2004

* cited by examiner

*Primary Examiner*—A. Elamin
*Assistant Examiner*—Anand B. Patel
(74) *Attorney, Agent, or Firm*—Garlick Harrison & Markison; Bruce E. Stuckman

(57) ABSTRACT

A memory device has a plurality of memory blocks utilized to store data. One of the blocks is used as a hidden memory block to store an operating system program, instead of data. The hidden memory block is designated as a bad block so that data will not be written into the hidden memory block, but a tag associated with the hidden memory block identifies that the hidden memory block contains the operating system program.

16 Claims, 25 Drawing Sheets multi-function handheld device 40 integrated circuit 12-2 integrated circuit 12-3 cell of GPIO

DAC 72 op amp 150 programmable driver 92 microphone bias 96 input interface 90 display interface system 250

DC to DC converter 26

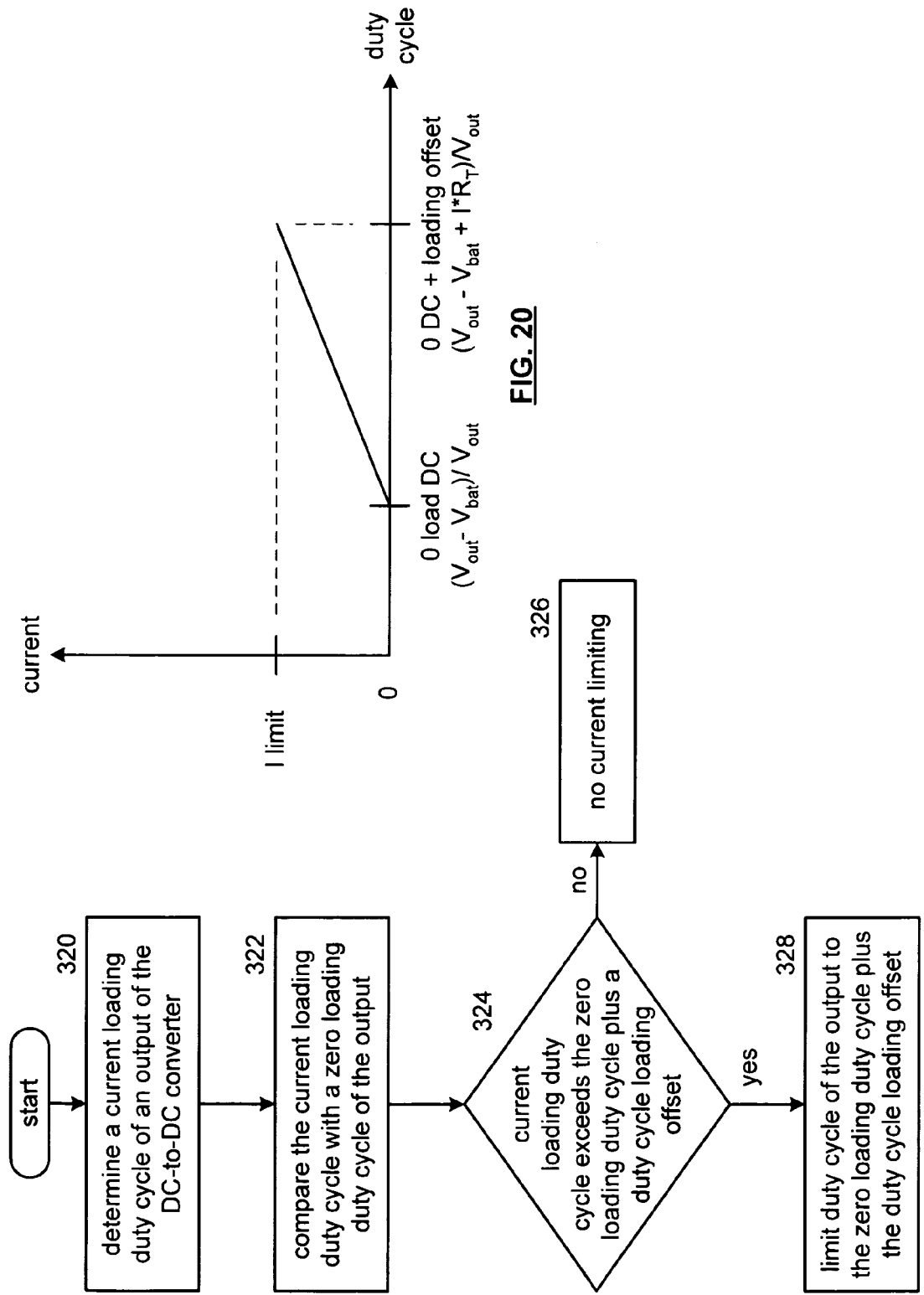

ESD protection circuit 330

ESD protection circuit 335

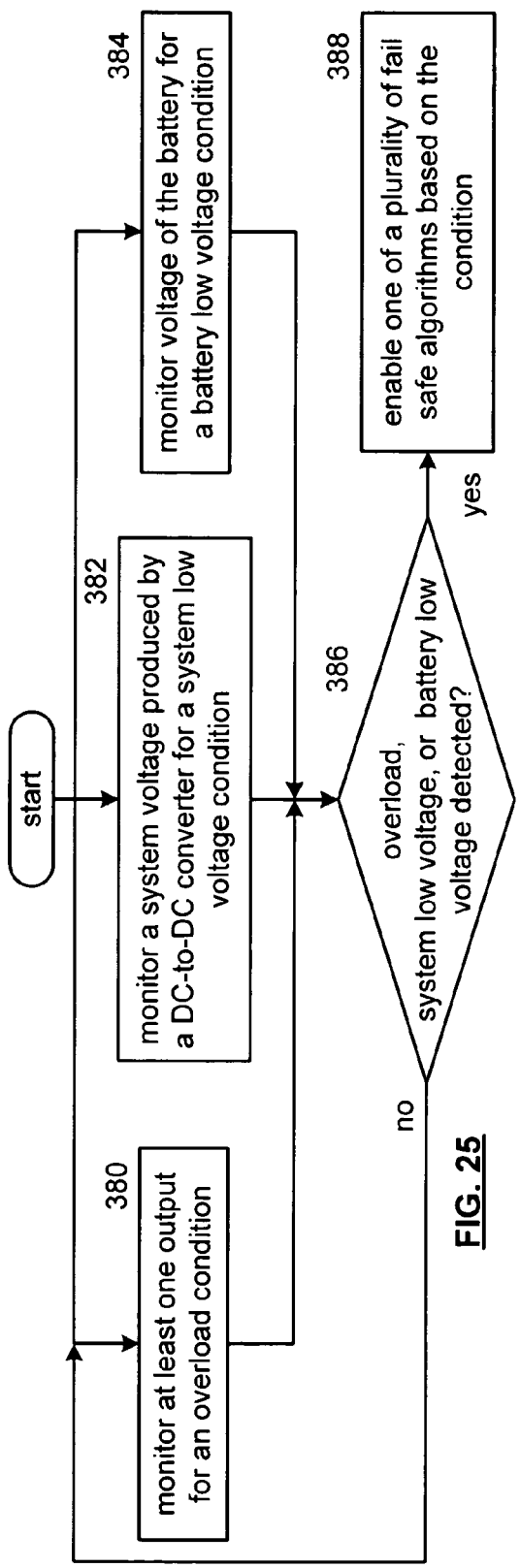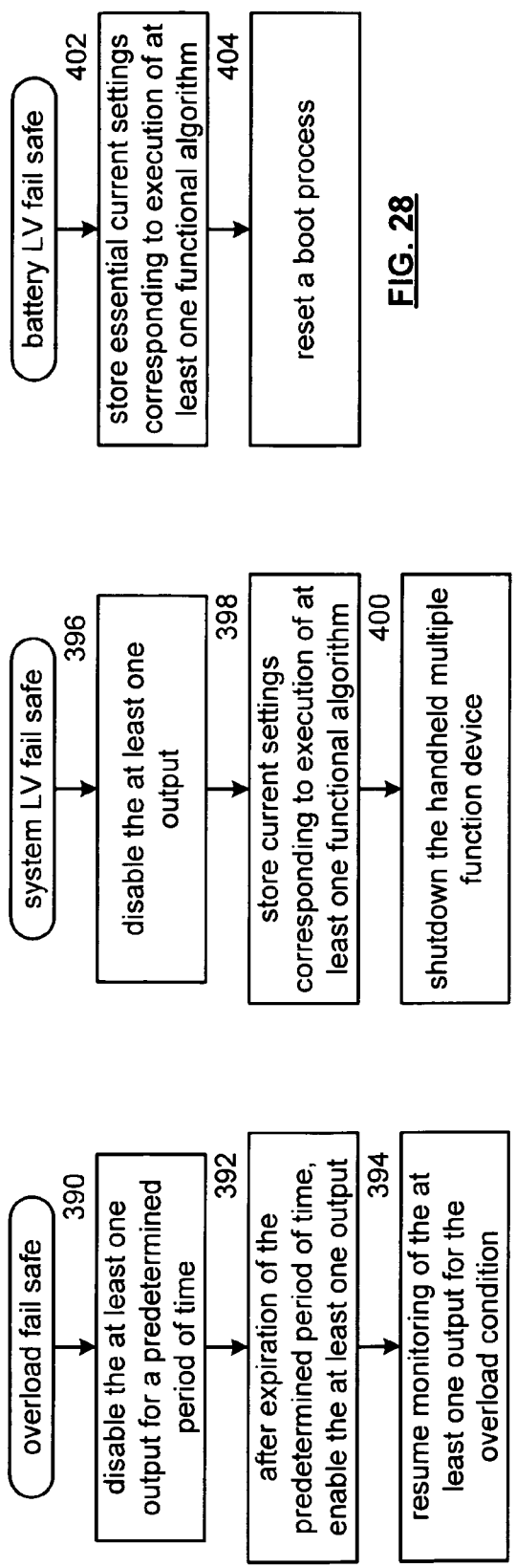

USE OF NAND FLASH FOR HIDDEN MEMORY BLOCKS TO STORE AN OPERATING SYSTEM PROGRAM

CROSS REFERENCE TO RELATED APPLICATION

This application claims the benefit of U.S. Provisional Patent Application entitled MULTI-FUNCTION HANDHELD DEVICE, having a Ser. No. 60/429,941 and a filing date of Nov. 29, 2002, which is incorporated herein by reference.

BACKGROUND OF THE INVENTION

1. Technical Field of the Invention

This invention relates generally to portable electronic equipment, and more particularly to a multi-function handheld device that employs a memory having hidden memory blocks to store operating system programs.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices include one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person may need to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

In a typical hand-held device, an integrated circuit that contains a processor or a controller generally loads a boot program from a memory device, such as a read only memory (ROM). In some instances the boot program is stored on a writable memory device, so that the boot program may be updated or reloaded with different versions of the booting program. In some instances, a NOR type flash memory device may be employed to store the boot program, since NOR flash memories are more suited for this type of operation. Accordingly, it is a typical practice to employ a ROM or a NOR flash memory for booting when the device is initialized. The advantage of the use of a flash memory is that the boot program may be customized. Furthermore, the flash device may be updated with newer or different boot programs.

Even though a ROM or a NOR flash memory device is employed with a processor, the actual data storage is performed utilizing other types of memory storage devices. For example, if the flash technology is employed, typical practice is to employ a NAND type flash memory device for mass storage of data, since NAND flashes are more suited for mass data storage. Therefore, prior art practice has been to employ a ROM or NOR type flash memory for storage of booting programs, while NAND type flash storage devices are utilized for the storing of data. Accordingly, embodiments of the present invention addresses a scheme in which both a boot program is stored on the same storage media as data, so that one type of storage device may be utilized to store both the boot program and data.

BRIEF SUMMARY OF THE INVENTION

The multi-function handheld device of the present invention substantially meets these needs and others. An embodiment of the device includes a host interface, a bus, a processing module, a memory interface, a multimedia module, and a DC-to-DC converter. The host interface is operable to receive or transmit data with a host device (e.g., personal computer, laptop computer, etc.) when the multi-function handheld device is operably coupled to the host device. The bus provides a medium for transmitting and/or receiving data between the host interface, the processing module, and the memory interface. The processing module functions to place the multi-function handheld device in a first functional mode when the host interface is operably coupled to the host device and places the multi-function handheld device in a second functional mode when the host interface is not operably coupled to the host device.

The memory interface is operably coupled to, when the multi-function handheld device is in the first functional mode, provide data received from the host device to memory coupled to the integrated circuit for storage. The memory interface also provides data retrieved from the memory to the host interface for transmission to the host device. The multimedia module is operably coupled to, when the multi-function handheld device is in the second functional mode, to convert data stored in the memory into rendered output data (e.g., prepares the data to be heard or seen). The DC to DC converter is operably coupled to provide at least a first supply voltage to at least one of the host interface, the processing module, the memory interface, and the multimedia module. With such an integrated circuit, a handheld device may provide multiple functions, thus reducing the burdens of handheld device users.

An embodiment of a handheld device includes the integrated circuit, a battery, and memory, which is coupled to the integrated circuit via the memory interface. The battery is operably coupled to the DC-to-DC converter, which produces therefrom the supply voltage(s) for the integrated circuit. The handheld device may further include a clock source, a speaker, a headphone jack, a microphone, a display, a video capture device, and/or an user input module (e.g., key pad).

An embodiment of the invention uses an external memory that stores both operating system program and data. The operating system program is stored in an external memory along with data. In order to separate the operating system program from data, the operating system program is stored in a hidden block designated as a bad block. A unique tag in the designated block identifies the block as a hidden block holding the operating system program. In one embodiment, the external memory is a NAND flash memory.

BRIEF DESCRIPTION OF THE SEVERAL VIEWS OF THE DRAWINGS

FIG. 19 is a logic diagram of a method for providing current limit in a DC-to-DC converter in accordance with one embodiment of the present invention.

FIG. 20 is a diagram corresponding to providing current limit in a DC-to-DC converter in accordance with one embodiment of the present invention.

FIG. 25 is a logic diagram of a method for providing efficient battery use in accordance with one embodiment of the present invention.

FIGS. 26 is a logic diagram of a method for providing an overload fail-safe algorithm in accordance with one embodiment of the present invention.

FIGS. 27 is logic diagram of a method for providing a system low voltage fail-safe algorithm in accordance with one embodiment of the present invention.

FIGS. 28 is logic diagram of a method for providing a battery low voltage fail-safe algorithm in accordance with one embodiment of the present invention.

DETAILED DESCRIPTION OF THE EMBODIMENTS OF THE INVENTION

Figure 1:
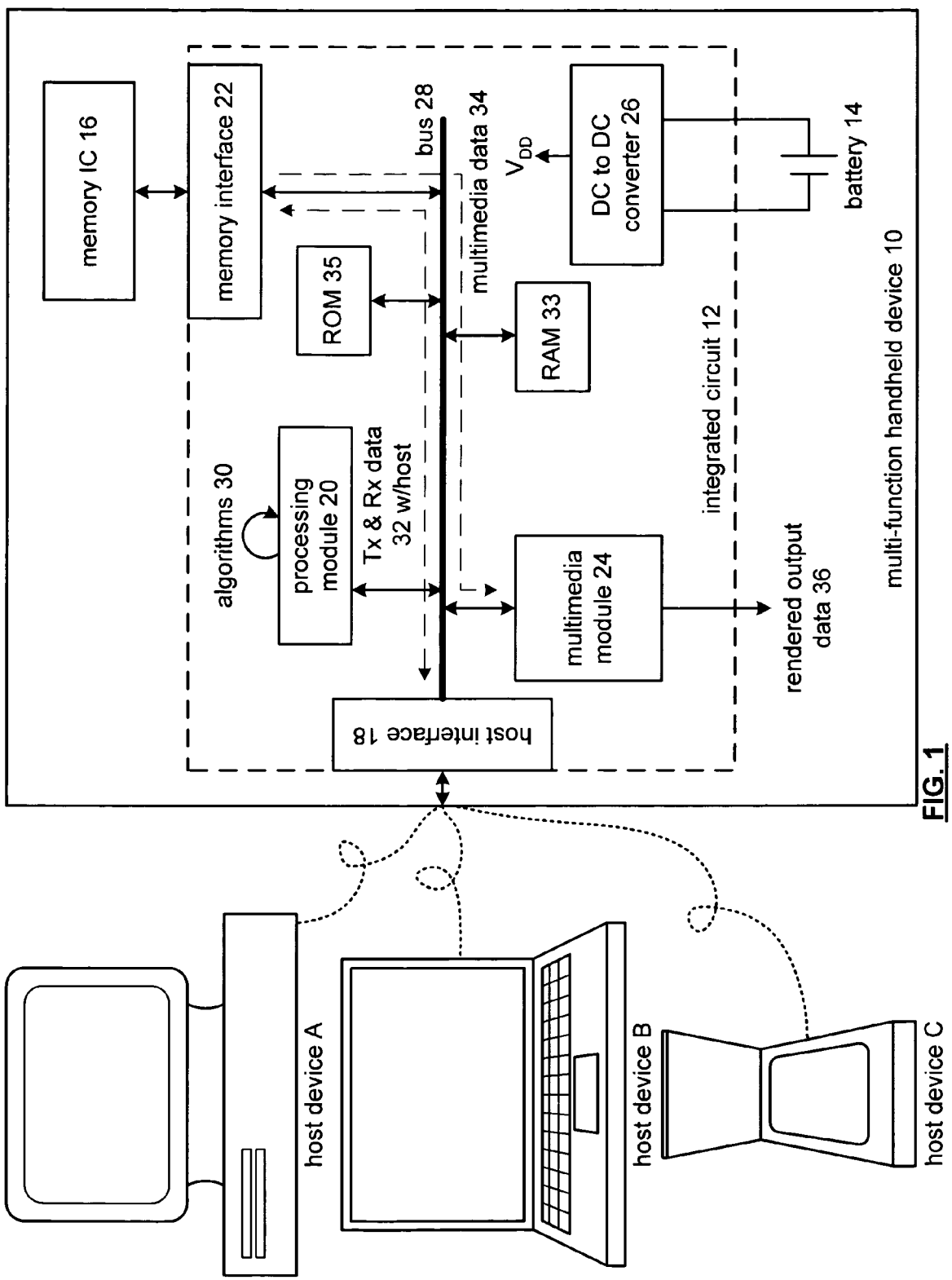
FIG. 1 is a schematic block diagram of a handheld device and corresponding integrated circuit in accordance with one embodiment of the present invention.

FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat. No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, which will be described in greater detail with reference to FIGS. 15–17 and 23–28, where the corresponding operational instructions of the algorithm 30 are stored in memory 16 and/or in memory incorporated in the processing module 20.

The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30. The interoperability of the memory IC 16 and the integrated circuit 12 will be described in greater detail with reference to FIGS. 15–17 and FIGS. 29–32.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data may be formatted in a particular manner. For example, if the handheld device 10 is coupled to the host device via a USB cable, the received data may be in accordance with the format proscribed by the USB specification. The host interface module 18 converts the format of the received data (e.g., USB format) into a desired format by removing overhead data that corresponds to the format of the received data and storing the remaining data as data words. Under the control of the processing module 20, the data words are provided, via the memory interface 22, to memory 16 for storage. In this mode, the handheld device 10 is functioning as extended memory of the host device (e.g., like a thumb drive).

In furtherance of the first functional mode, the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

It is to be noted that the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. It is to be noted that when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Since these functions may be known in the art, no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

The handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
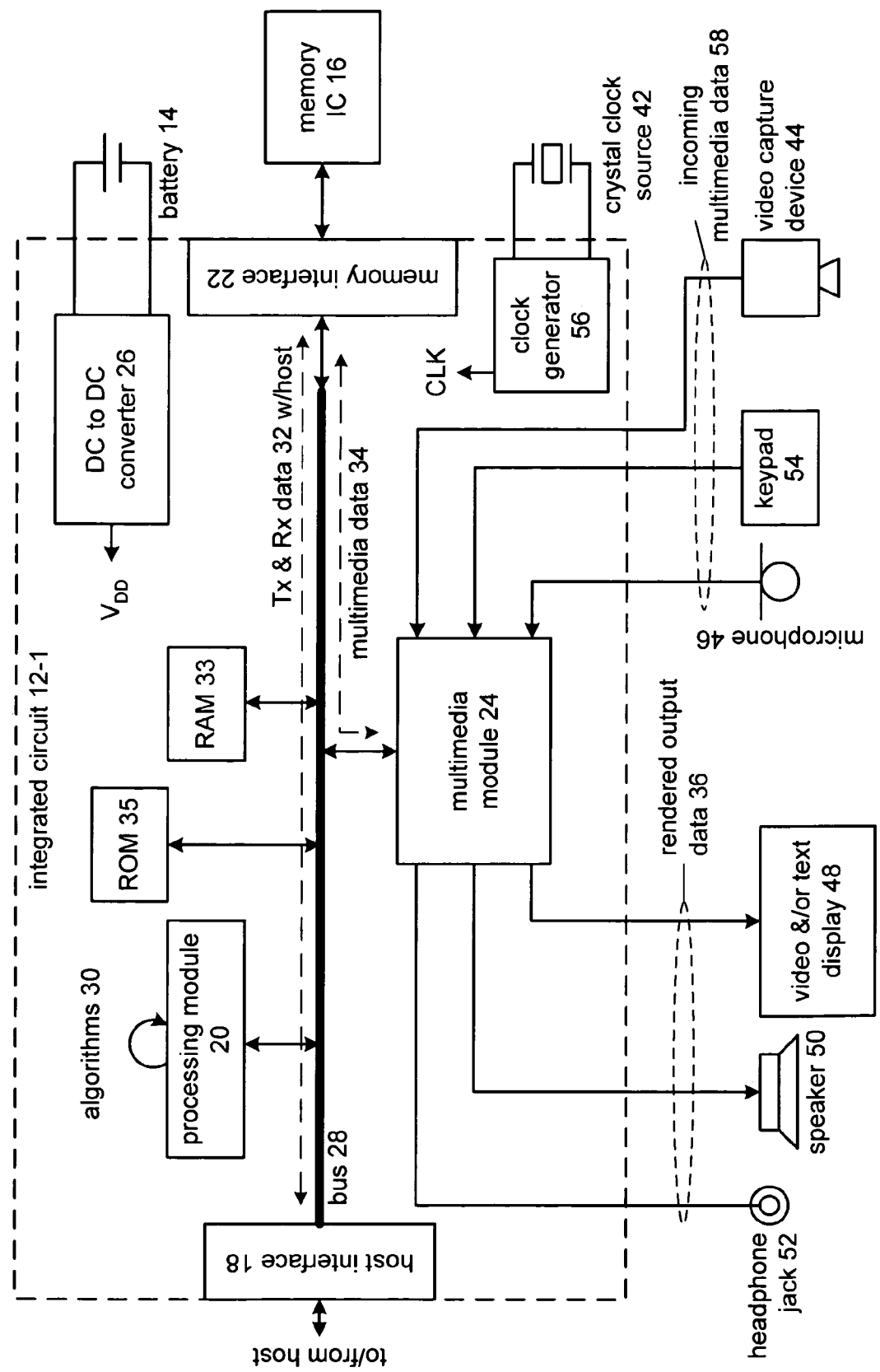
FIG. 2 is a schematic block diagram of another handheld device and corresponding integrated circuit in accordance with one embodiment of the present invention.

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. The clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the key pad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode may include the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
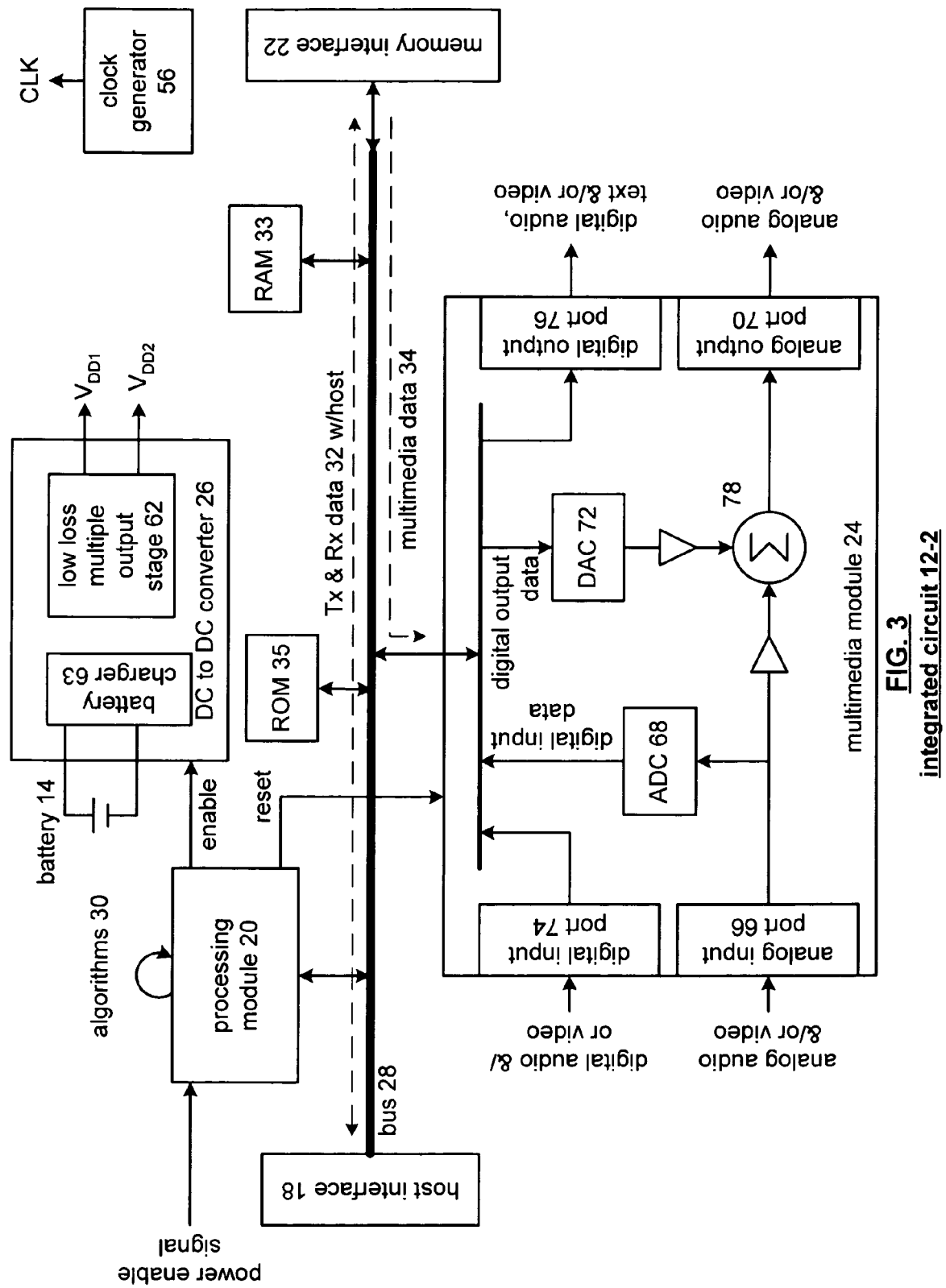
FIG. 3 is a schematic block diagram of another integrated circuit in accordance with one embodiment of the present invention.

FIG. 3 is a schematic block diagram of an integrated circuit 12-2 that may be used in a multi-function handheld device. The integrated circuit 12-2 includes the host interface 18, the processing module 20, the DC-to-DC converter 26, memory 60, the clock generator 56, the memory interface 22, the bus 28 and the multimedia module 24. The DC-to-DC converter 26 includes a first output section 62, and a second output section 64 to produce a first and second output voltage ($V_{DD1}$ and $V_{DD2}$), respectively. Typically, $V_{DD1}$ will be greater that $V_{DD2}$, where $V_{DD1}$ is used to source analog sections of the processing module 20, the host interface 18, the memory interface 22, and/or the multimedia module 22 and $V_{DD2}$ is used to source the digital sections of these modules.

The DC-to-DC converter 26 may further include a battery charger 63 and a low loss multiple output stage 62, which will described in greater detail with reference to FIGS. 18–20. The battery charger 63 is operable to charge the battery 14 from power it receives via the physical coupling (e.g., via a USB cable) to the host device when the multi-function handheld device is physically coupled to the host device. The particular implementation of the battery charger 63 is dependent on the type of battery being used and such implementations may adapt those techniques known in the art, thus no further discussion will be provided regarding the battery charger 63 except to further illustrate the concepts of the embodiments of the present invention.

The multimedia module 24 includes an analog input port 66, an analog to digital converter (ADC) 68, an analog output port 70, a digital to analog converter (DAC) 72, a digital input port 74, a digital output port 76, and an analog mixing module 78. The analog input port 66 is operably coupled to receive analog input signals from one or more sources including a microphone, an AM/FM tuner, a line in connection (e.g., headphone jack of a CD player), etc. The received analog signals are provided to the ADC 68, which produces digital input data therefrom. The digital input data may be in a pulse code modulated (PCM) format and stored as such, or it may be provided to the processing module 20 for further audio processing (e.g., compression, MP3 formatting, etc.) The digital input data, or the processed version thereof, may be stored in memory 16 as instructed by the processing module 20.

The digital input port 74 is operably coupled to receive digital audio and/or video input signals from, for example, a digital camera, a camcorder, etc. The digital audio and/or video input signals may be stored in memory 16 under the control of the processing module 20. It is to be noted that the audio and/or video data (which was inputted as analog signals or digital signals) may be stored as raw data (i.e., the signals received are stored as is in designated memory locations) or it may be stored as processed data (i.e., compressed data, MPEG data, MP3 data, WMA data, etc.).

The DAC 72, which will be described in greater detail with reference to FIGS. 8–10, receives multimedia data 34 as digital output data and converts it into analog video and/or audio output data that is provided to the mixing module 78. When the output of the DAC 72 is the only input to the mixing module 78, the mixing module 78 outputs the analog video and/or audio output data to the analog output port 70. The analog output port 70 may be coupled to one or more of the speaker, headphone jack, and a video display. The mixing module 78 may mix analog input signals received via the analog input port 66 with the output of DAC 72 to produce a mixed analog signal that is provided to the analog output port 70. Note that the buffers in series with the inputs of the mixing module 78 may have their gains adjusted and/or muted to enable selection of the signals at various gain settings provided to the mixing module 78 and subsequently outputted via the analog output port 70.

The digital output port 76 is operably coupled to output the digital output data (i.e., the multimedia data 34 in a digital format). The digital output port 76 may be coupled to a digital input of a video display device, another handheld device for direct file transfer, etc.

It is to be noted that the multimedia module 24 may include more or less components than the components shown in FIG. 3 or include multiple analog and/or digital input and/or output ports. For example, for a playback mode of digital audio files, the multimedia module 24 may only include the DAC 72 and the analog output port 70 that is coupled to the headphone jack and/or to the speaker. As another example, for recording voice samples (i.e., as a digital dictaphone), the multimedia module 24 may include the analog input port 66 coupled to the microphone and the ADC.

Figure 4:
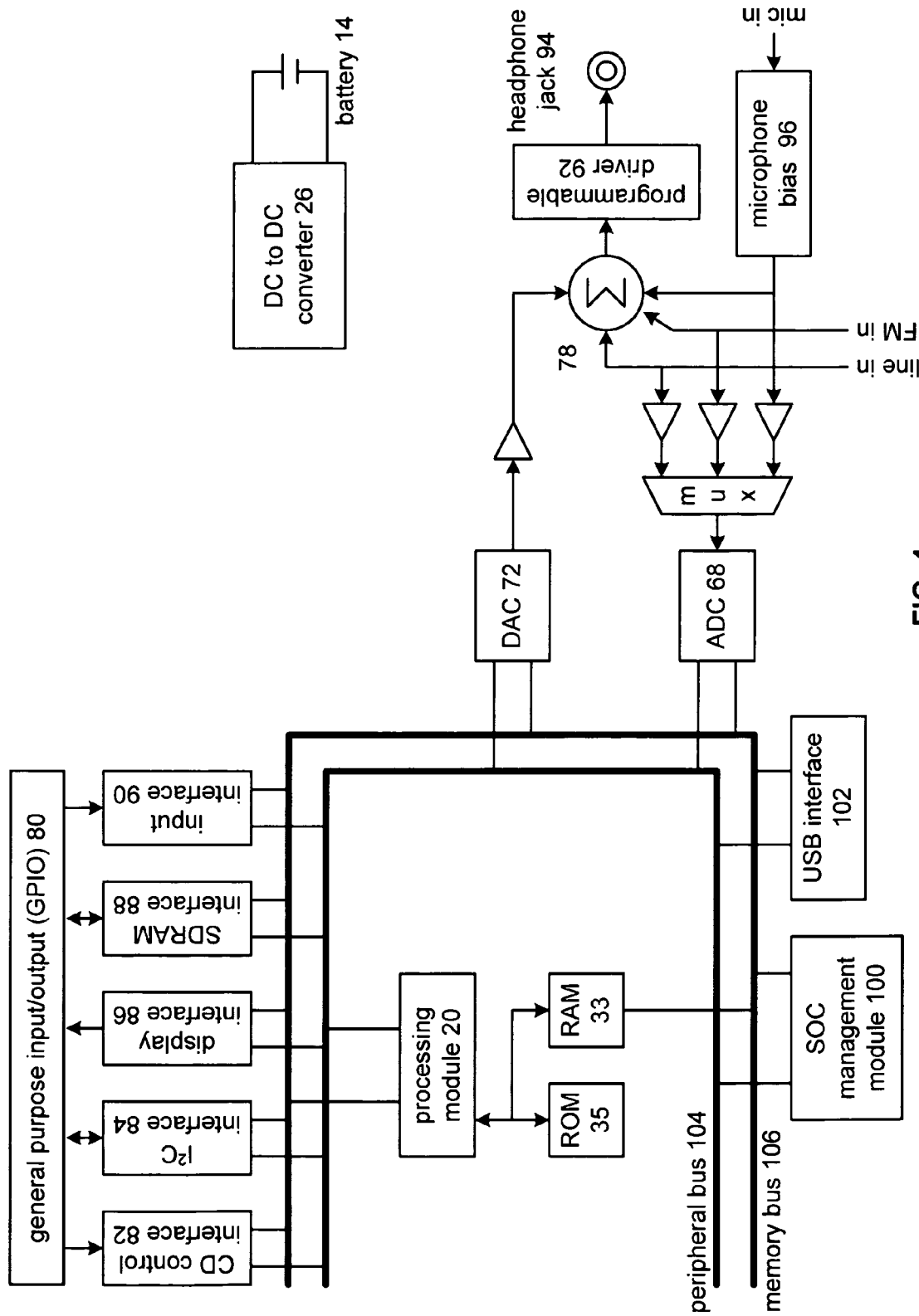
FIG. 4 is a schematic block diagram of yet another integrated circuit in accordance with one embodiment of the present invention.

FIG. 4 is a schematic block diagram of an integrated circuit 12-3 that may be incorporated in a multi-function handheld device 10 or 40. The integrated circuit 12-3 includes a general purpose input/output module 80, a CD control interface 82, an I²C interface module 84, a display interface module 86, a static and/or dynamic RAM interface 88, an input interface module 90, processing module 20, ROM 35, RAM 33, a peripheral bus 104, a memory bus 106, a system-on-a-chip (SOC) management module 100, a universal serial bus (USB) interface 102, a digital-to-analog converter 72, an analog-to-digital converter 68, a multiplexer, buffers, mixing module 78, DC to DC converter 26, a programmable driver 92, and a microphone bias module 96.

In operation, the integrated circuit 12-3 may facilitate the transceiving of data with a host device between system memory of a multi-function handheld device and a host device, may playback multimedia data, and/or may record multimedia data via input ports. When the integrated circuit 12-3 is transceiving with a host device, the USB interface 102 operably couples the integrated circuit 12-3 to a host device.

In addition, the SDRAM interface 88 couples, either via the general purpose input/output module 80 or directly, to the system memory (e.g., memory IC 16) of the multi-function handheld device 10. In this configuration, data that is received from the host device is placed on the memory bus 106 by the USB interface 102. The SDRAM interface 88 retrieves the data from the memory bus 106 and forwards it for storage to the system memory under the control of the processing module 20 that is executing a file system storage algorithm. The data being stored may correspond to playback data, such as an MP3 file, a WMA file, a video file, a text file, and/or a combination thereof. Alternatively, or in addition to, the data being received from the host may correspond to programming instructions of an algorithm 30, which may be an MP3 decoder algorithm, a WMA decoder algorithm, a MPEG algorithm, a JPEG algorithm, et cetera.

For providing data from the handheld device 10 to the host device, the SDRAM interface 88 retrieves data from the system memory and places it on the memory bus 106 under the control of the processing module 20 as it executes a file system algorithm. The USB interface 102 retrieves the data from the memory bus 106 and forwards it to the host device in accordance with one of the versions of the USB standard.

Data may also be stored in the system memory that is received via the CD (compact disk) control interface 82, and/or the I²C interface 84 or other type of two or three wire data interface. Via these interfaces 82 and 84, data is received via the general purpose input/output module 80, which will be described in greater detail with reference to FIG. 7, and placed on the memory bus 106. The SDRAM interface 88 retrieves the data from the memory bus 106 and provides it to the system memory, which is done under the control of the processing module as it executes a data storage algorithm.

Figure 12:
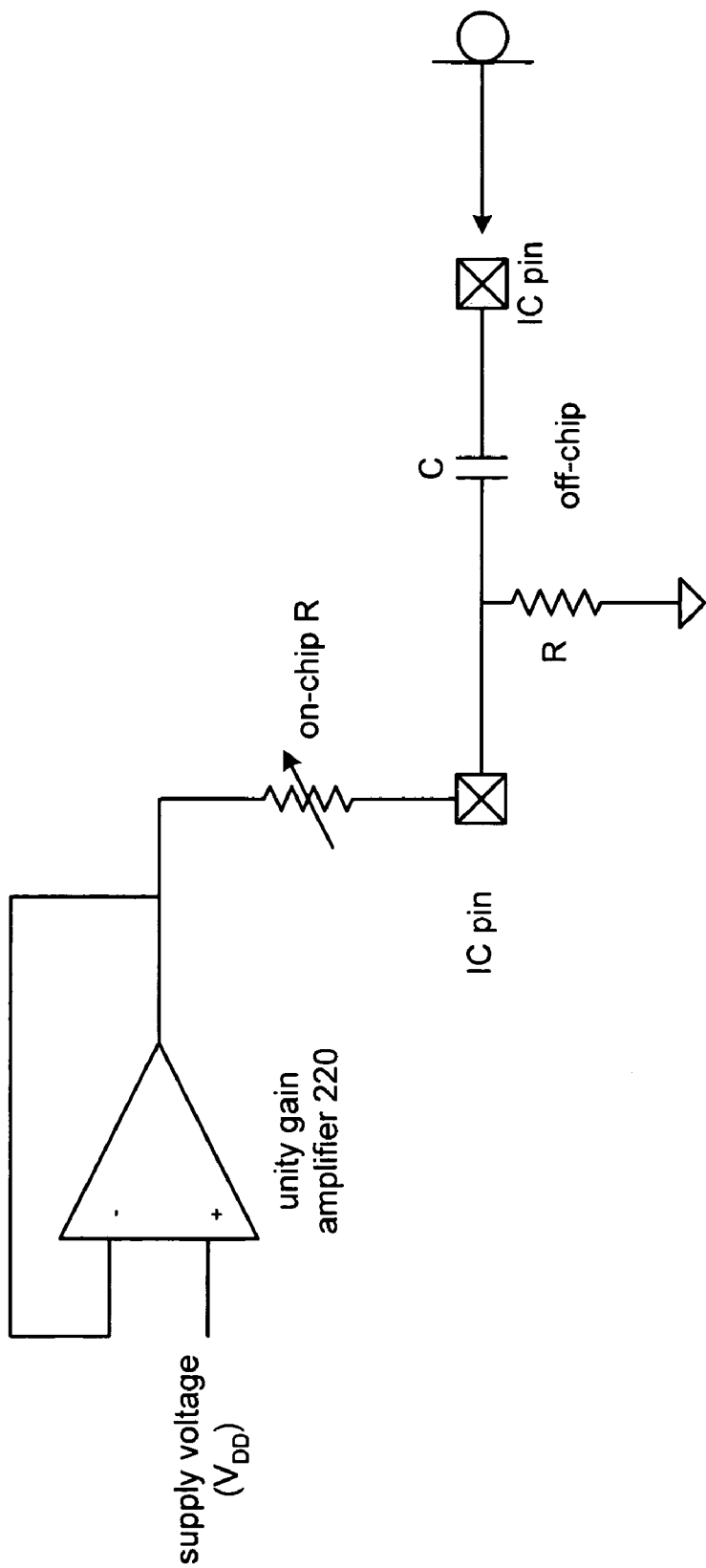
FIG. 12 is a schematic block diagram of a microphone bias circuit in accordance with one embodiment of the present invention.

When the integrated circuit 12-3 is recording audio inputs received via the microphone input, the microphone bias circuit 96, which will be described in greater detail with reference to FIG. 12, provides the received audio signals to the mixing module 78 as well as to the multiplexer (mux) via a buffer. The microphone bias circuit 96 biases the audio input for optimal operations. The received audio input signals are converted to digital audio signals via the analog-to-digital converter 68. The digital audio signals may then be stored in system memory (e.g., memory IC 16). Alternatively, the audio input signal may be provided to the summing module 78 and subsequently provided to headphone jack 94 via the programmable driver 92 as a component of a summed analog signal. The summing module 78 may sum, or pass any one of, the audio input signals may be mixed with other analog input signals, such as a line input, an FM radio input, and the analog output of the DAC 72, to produce the summed signal.

When the integrated circuit 12-3 is in a playback mode, digital multimedia data is retrieved from the system memory and provided to the digital-to-analog converter 72. The digital-to-analog converter 72, which will be described in greater detail with reference to FIGS. 8–10, converts the digital multimedia signals, which may be audio data, video data and/or text data, into analog multimedia signals and provides the analog multimedia signals to mixing module 78. In the playback mode, the mixing module 78 may have the other inputs muted, such that its output corresponds directly to the analog multimedia signals provided by the digital-to-analog converter 72.

The programmable driver 92, which will be described in greater detail with reference to FIG. 11, increases the drive power of the analog multimedia signals (e.g., audio signals when the analog multimedia signals are provided to a headphone) and provides it to the headphone jack 94. It is to be noted that a fixed driver may replace the programmable driver 92 to drive the headphone jack 94.

To place the integrated circuit 12-3 into the various operational modes, commands are received via the general purpose input/output module 80 by the input interface 90. The input interface 90, which will be described in greater detail with reference to FIG. 13, receives the input stimulus corresponding to commands, interprets the input stimulus to generate the corresponding commands. The commands are then provided on the peripheral bus 104 and/or the memory bus 106 and processed by the processing module 20.

In addition to producing audio outputs during playback mode, the integrated circuit 12-3 may provide video outputs via the display interface 86, which will be described in greater detail with reference to FIG. 14. The display interface 86 drives the display, which may be an LCD display, LED display, plasma display and/or any other type of display. The data being displayed may correspond to the multimedia data retrieved from the system memory, and/or may correspond to the commands inputted via the input interface 90.

The system-on-a-chip (SOC) management module 100 processes interrupt controls, generates clock signals for the integrated circuit 12-3, performs bit manipulations, performs debugging operations, and executes a Reed-Solomon, or other type of encoding/decoding algorithm to encode and/or decode data.

Figure 18:
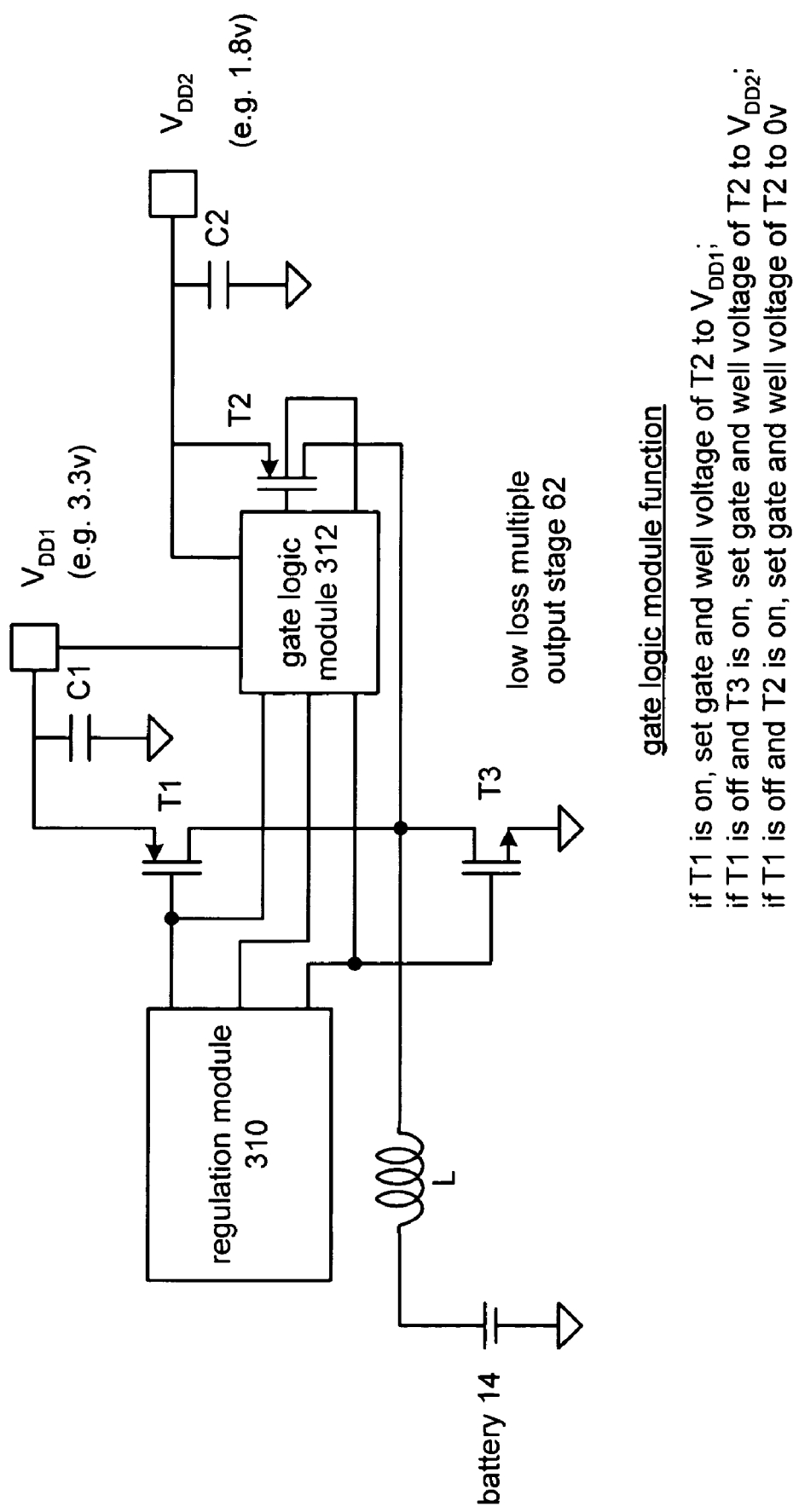
FIG. 18 is a schematic block diagram of a DC-to-DC converter in accordance with one embodiment of the present invention.

The DC to DC converter 26, which will be described in greater detail with reference to FIGS. 18–20, provides at least one supply voltage for the integrated circuit 12-3 and typically provides two supply voltages. For example, the DC to DC converter 26 may produce a 3.3 volts supply and a 1.8 volt supply.

Figure 5:
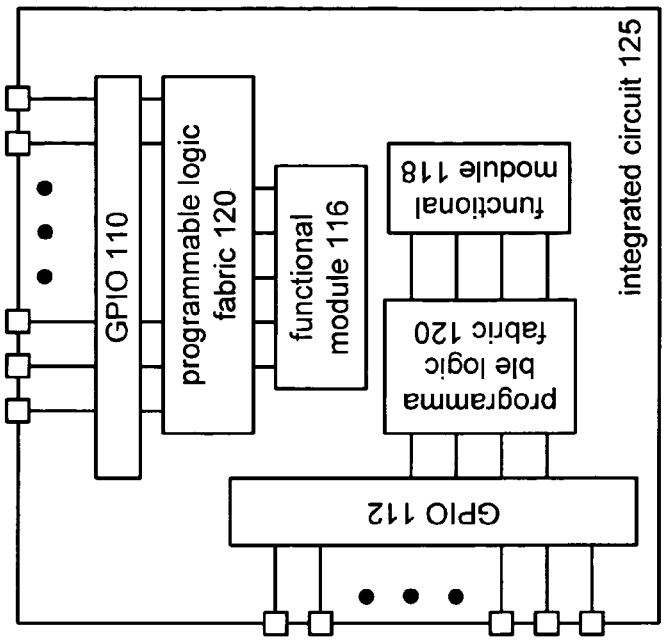
FIG. 5 is a schematic block diagram of still another integrated circuit in accordance with one embodiment of the present invention.

FIG. 5 is a schematic block diagram of an integrated circuit 115 that may be used in a multi-function handheld device 10. In this embodiment, the integrated circuit 115 includes a plurality of general purpose input/output (GPIO) modules 110 and 112. Each GPIO 110 and 112 is coupled to a functional module 116 and 118, respectively. The functional modules 116 and 118 may correspond to the processing module 20, the CD control interface module 82, the I²C interface module 84, display interface module 86, SD RAM interface module 88, the input interface module 90, and/or any other type of data interface that may be used in a handheld multi-function device.

Figure 6:
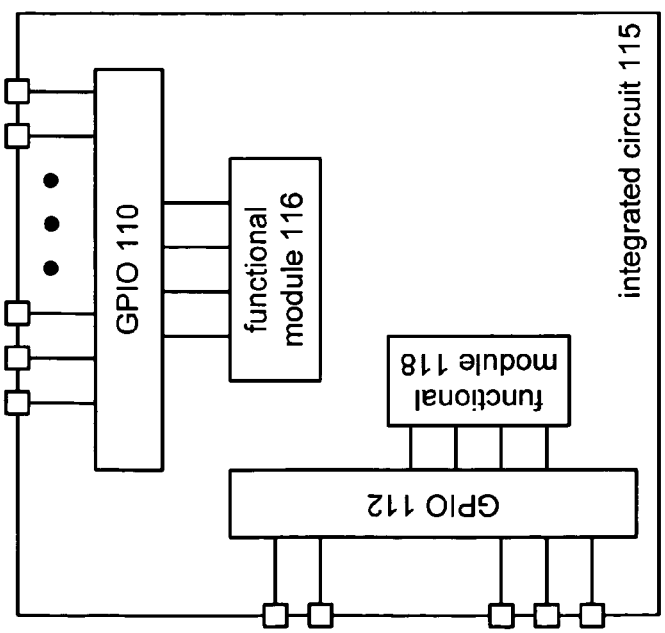
FIG. 6 is a schematic block diagram of a further integrated circuit in accordance with one embodiment of the present invention.

FIG. 6 illustrates an alternate embodiment of an integrated circuit 125 that may be used in the multi-function handheld device 10. In this embodiment, the integrated circuit 125 includes a plurality of GPIOs 110 and 112, a plurality of functional modules 116 and 118 and further includes programmable logic fabric 120. The programmable logic fabric may be field programmable gate array circuitry, programmable gate array circuitry and/or any other type of configurable circuitry. The programmable logic fabric 120 provides flexibility in configuring the functional modules 116 and 118 to the general purpose interfaces 110 and 112.

Figure 7:
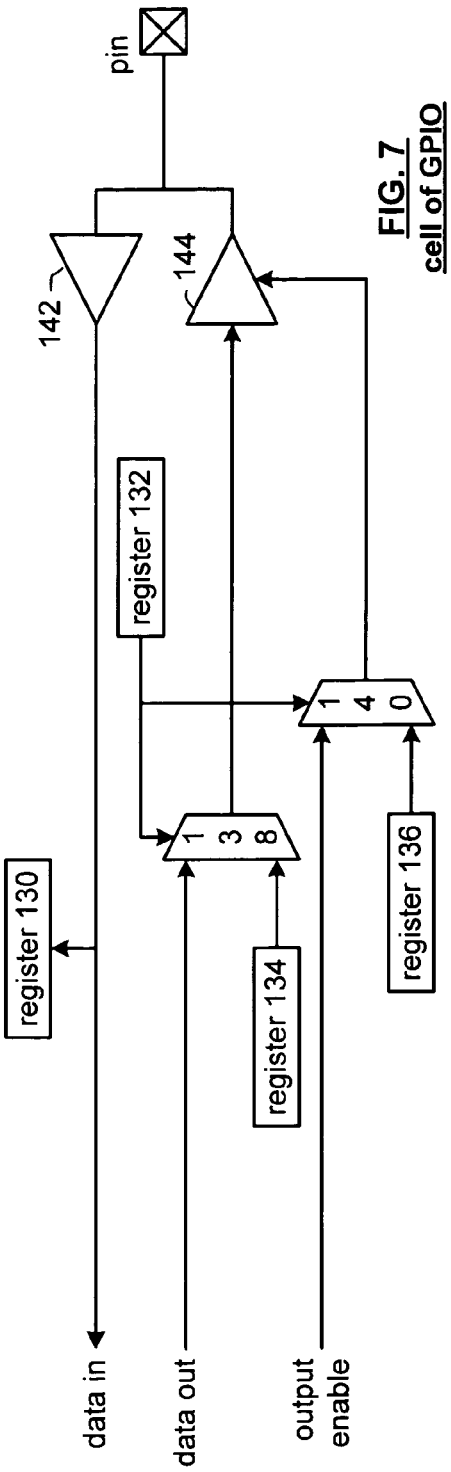
FIG. 7 is a schematic block diagram of a cell of a general purpose input output interface in accordance with one embodiment of the present invention.

FIG. 7 illustrates a cell of a general purpose input/output module 80, 110 and/or 112. The cell corresponds to one input/output signal coupled to one input/output pin of the integrated circuit. As shown, the cell of the GPIO includes a plurality of registers 130–136, a plurality of multiplexers 138 and 140, and a plurality of drivers 142 and 144. Register 132 stores a mode select signal that controls the multiplexers 138 and 140. In a 1st state of register 132, which may correspond to configuring the pin as an output pin, the 1st state causes the multiplexer 138 to pass output data to driver 144. In addition, multiplexer 140 passes an output enable signal to the tri-state input of driver 144, which activates driver 144. As such, in this state, the pin is configured as an output pin for output data. In a $2^{nd}$ state, multiplexer 138 may pass data stored in register 134 to driver 144 and multiplexer 140 passes the output enable signal to driver 144. In a $3^{rd}$ state, multiplexer 140 may be configured to pass the data stored in register 136 to the tri-state control of the driver 144 and multiplexer 138 may pass the output data to driver 144. In a $4^{th}$ state, multiplexer 140 may pass the data stored in register 136 to the tri-state control input of driver 144 and multiplexer 138 may pass the data stored in register 134. With these various states of configuring the pin as an output pin, the processing module, while executing an algorithm, may write data into the registers 132–136 and use the same output pin for multiple outputs.

When the cell of the GPIO is configured to enable the pin to function as an input pin, the output enable signal is disabled, and register 132 causes multiplexer 140 to pass a signal that holds the output driver 144 in a high impedance state. In this mode, input data received via the pin is provided to the integrated circuit via the driver 142. In addition, the input data may be stored in register 130 under the control of the processing module 20 while it executes an algorithm.

Figure 8:
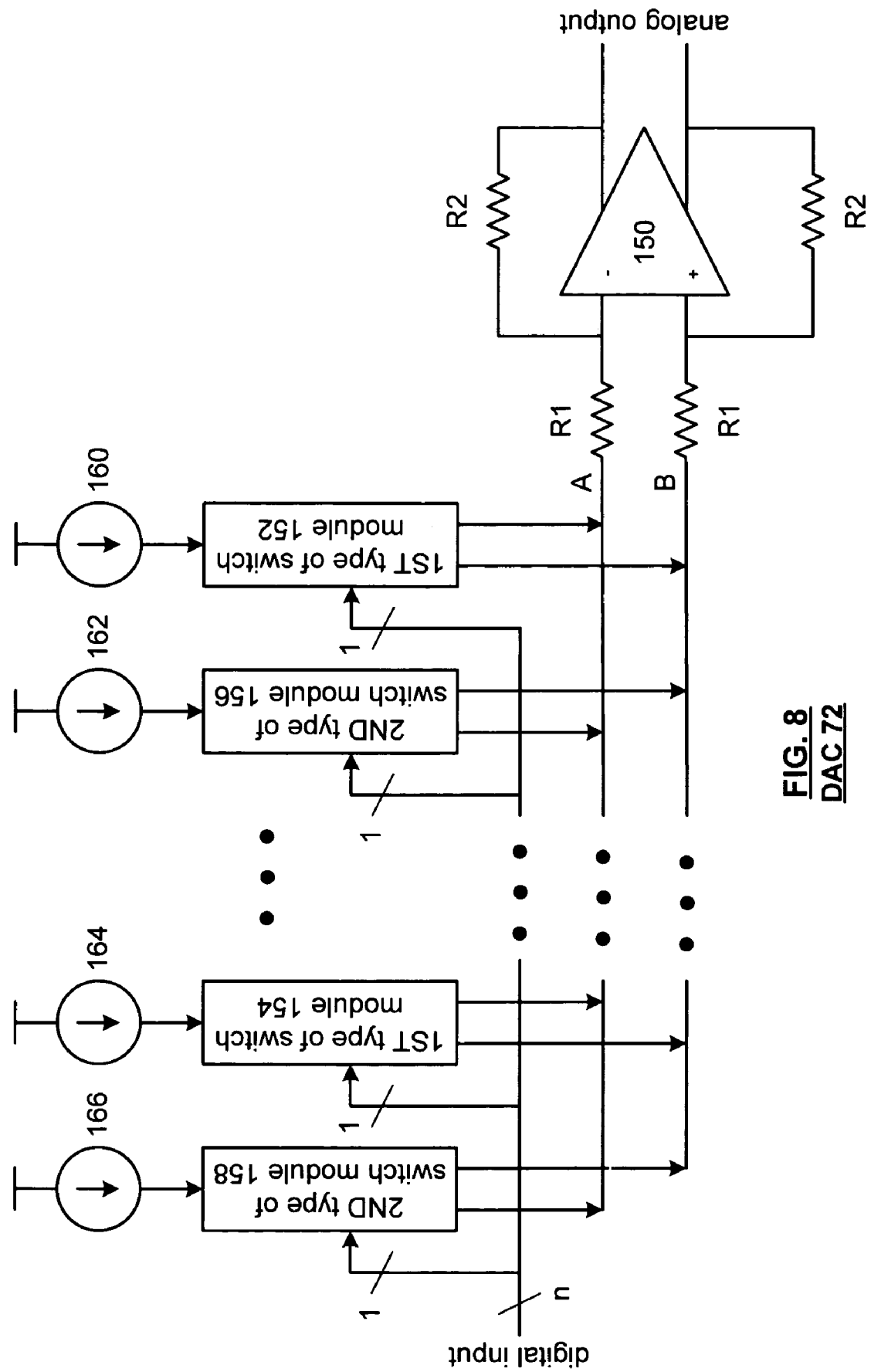
FIG. 8 is a schematic block diagram of a digital to analog converter in accordance with one embodiment of the present invention.

FIG. 8 is a schematic block diagram of the digital-to-analog converter 72. The digital-to-analog converter 72 includes a plurality of current sources 160–166, a plurality of switching modules 152–158, and a differential amplifier 150 wherein the gain of the differential amplifier 150 is based on the ratio of resisters R1 and R2. It is to be noted that the feedback circuitry corresponding to the gain of the operational amplifier 150 may include additional resisters, capacitors, et cetera to establish a desired frequency response.

The switching modules 150–158 include a 1st type of switching module 152 and 154 and a 2nd type of switching module 156 and 158. The switching modules 152–158 are operably coupled to provide currents from its corresponding current source 160–166 to the A and/or B input of the differential amplifier circuit 150. The amount of current provided to the A input and B input is dependent on a corresponding bit of the digital input. As shown, the digital input may include n-bits where one of the n-bits controls the switching of the corresponding switching modules 152–158. For example, if the digital input includes 4 bits, the most significant bit would be provided to switching module 152, the 2nd most significant bit to switching module 156, the 3rd most significant bit to switching module 154 and the 4th most significant bit to switching module 158.

Continuing with the 4-bit example, in one embodiment, the current sources 160–166 are scaled to provide a corresponding current. For example, current source 160 provides a ½ current value, current source 162 provides a ¼th current value, current source 164 provides a ⅛th current value and current source 166 provides a ¹⁄₁₆th current value. In general, current sources 166 and 164, which correspond to the least significant bits, provides a current value of $\frac{1}{2}^{n}*I$ and $\frac{1}{2}^{n-1}*I$, respectively. In this example, if the most significant bit is 1, the switching module 152 provides a current to input A and B that produces an analog output voltage of ½ of the maximum output voltage of operational amplifier 150. If the remaining bits of the digital input are 0, the digital value of 1000 produces an analog output of 1 of the maximum analog output.

If the $2^{nd}$ most significant bit is a logic one, switching module 156 provides current to inputs A and B that produces an analog output voltage of $\frac{1}{4}^{th}$ the maximum analog output voltage of operational amplifier 150. If this is the only bit that is high, i.e., the digital input is 0100, the resulting analog output is $\frac{1}{4}^{th}$ of the maximum analog output value. If, however, the $1^{st}$ and $2^{nd}$ most significant bits are high, i.e., a digital input of 1100, the analog output is the sum of the $\frac{1}{4}^{th}$ analog output and ½ analog output, which yields a ¾ths analog maximum output value. The remaining two bits add a $\frac{1}{8}^{th}$ analog value to the analog output and a $\frac{1}{16}^{th}$ maximum analog output component to the resulting analog output, respectively.

When the digital-to-analog converter 72 is implemented on an integrated circuit using CMOS technology, or the like, the components comprising the switching modules 152–154 and the current sources 160–166, while designed to match, do not exactly match due to temperature variations, process variations, et cetera. These mismatches produce errors in the current being supplied to nodes A and B. This error causes the analog output voltage to not directly map to the desired analog voltage for the corresponding digital input (e.g., a digital input of 1100 does not exactly produce a $\frac{3}{4}^{th}$ of maximum analog output). In accordance with an embodiment of the presence invention, by having a $1^{st}$ type of switching module that produces a positive error signal and a $2^{nd}$ type of switching module that produces a negative error signal, the resulting error, over time, is substantially reduced. This concept will be described with greater detail with reference to FIG. 9.

It is to be noted that the current sources 160–166 may all be of a like current source wherein the input to the differential operational amplifier 150 may include a resistive network to scale the corresponding digital inputs through the operational amplifier 150.

Figure 9:
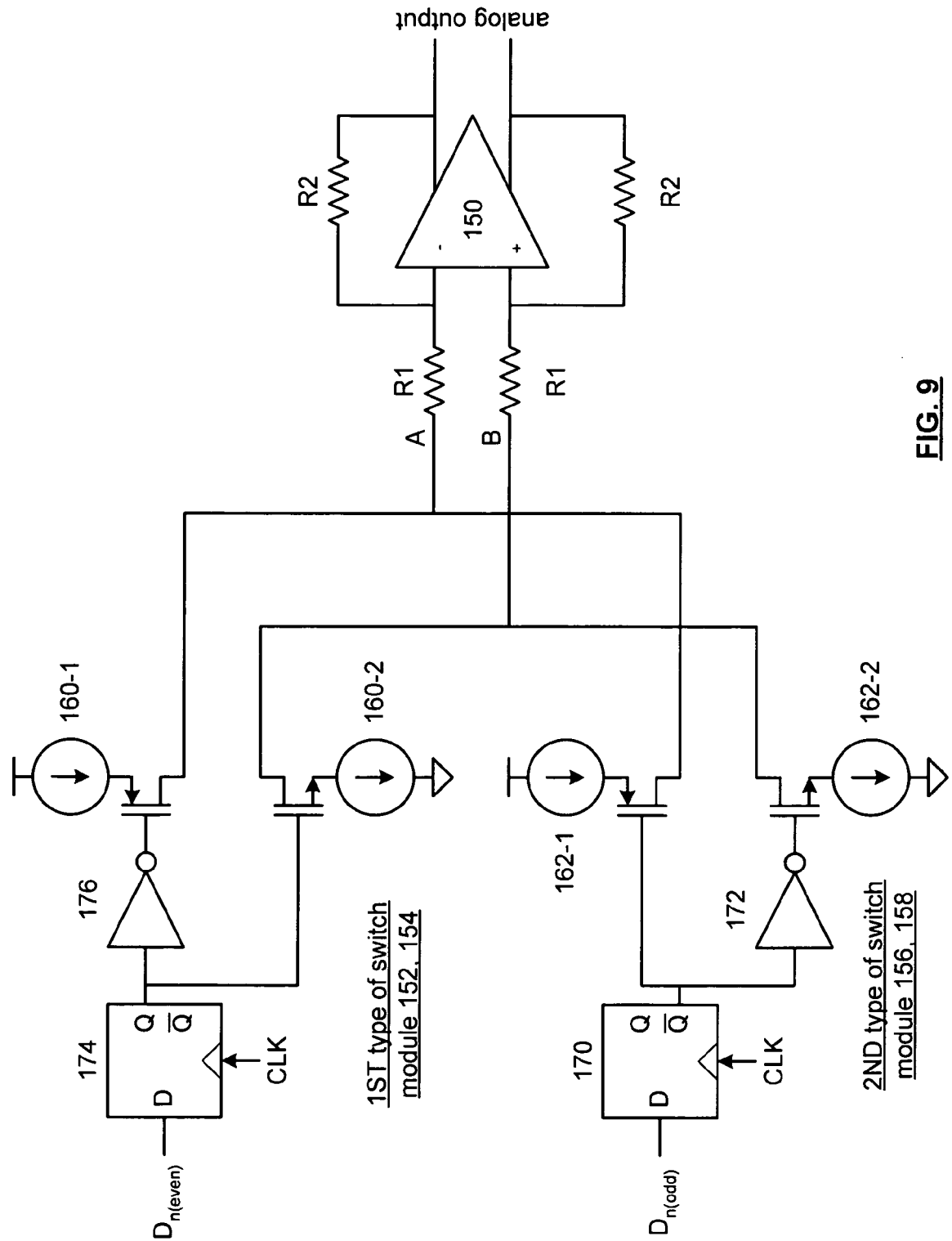
FIG. 9 is a schematic block diagram of a digital to analog converter in accordance with one embodiment of the present invention.

FIG. 9 illustrates the digital-to-analog converter 72 with the $1^{st}$ type of switching module 150, 154 and the $2^{nd}$ type of switching module 156, 158 shown in greater detail. As shown, the $1^{st}$ type of switching module 150, 152 includes a D flip-flop 174, and inverter 176, a P-transistor, an N-transistor and two current sources 160-1 and 160-2. The $2^{nd}$ type of switching module 156, 158 includes a D flip-flop 170, an inverter 172, a P-channel transistor, an N-channel transistor and current sources 162-1 and 162-2.

The $1^{st}$ type of switching module 152, 154 is operably coupled to receive even number bits of the digital input at the D input of flip-flop 174. The non-inverting Q output of flip-flop 174 drives the inverter 176 and the gate of the N-transistor. Accordingly, when the digital input is a logic 1, after the rising (or falling) edge of the clock signal occurs, the non-inverting Q output is high, which enables the N-transistor and the P-transistor. With the N and P-transistors active, current source 160-1 is sourcing current into node A and current source 160-2 is syncing current from node B. Since the switching speeds (i.e., slew rates) of the D flip-flop, inverter 176, and the N and P-channel transistors are not identical, an error signal may result. It is to be noted that the P-channel transistor may be driven from the inverting output Q of the flip-flop 174 and omit the inverter 176.

The $2^{nd}$ type of switching module 156–158 receives at the D input of flip-flop 170 odd bits of the digital input. Accordingly, when the input of an odd bit is a logic 1, the inverting output Q, when the clock signal transitions, is low. With this signal low, the P-channel transistor is enabled as well as the N-channel transistor through inverter 172. In this configuration, the current source 162-1 is sourcing current into node A and current 162-2 is syncing current from node B. By inverting the triggering of the N and P-channel transistors in the $2^{nd}$ type of switching module with respect to the $1^{st}$ type of switch module, the error produced is in the complimentary direction of the error produced by the first type of switching module. For example, if the $1^{st}$ type of switching module produces a positive error signal, the $2^{nd}$ type of switching module produces a corresponding negative error signal. As such, over time, the positive error signal is substantially cancelled by the negative error signal thus substantially reducing the net error caused by mismatching of the components of the digital-to-analog converter. It is to be noted that a large impedance may be included between node A and B such that when all of the digital inputs are 0, the inputs at node A and B are zero to produce a zero analog output.

Figure 10:
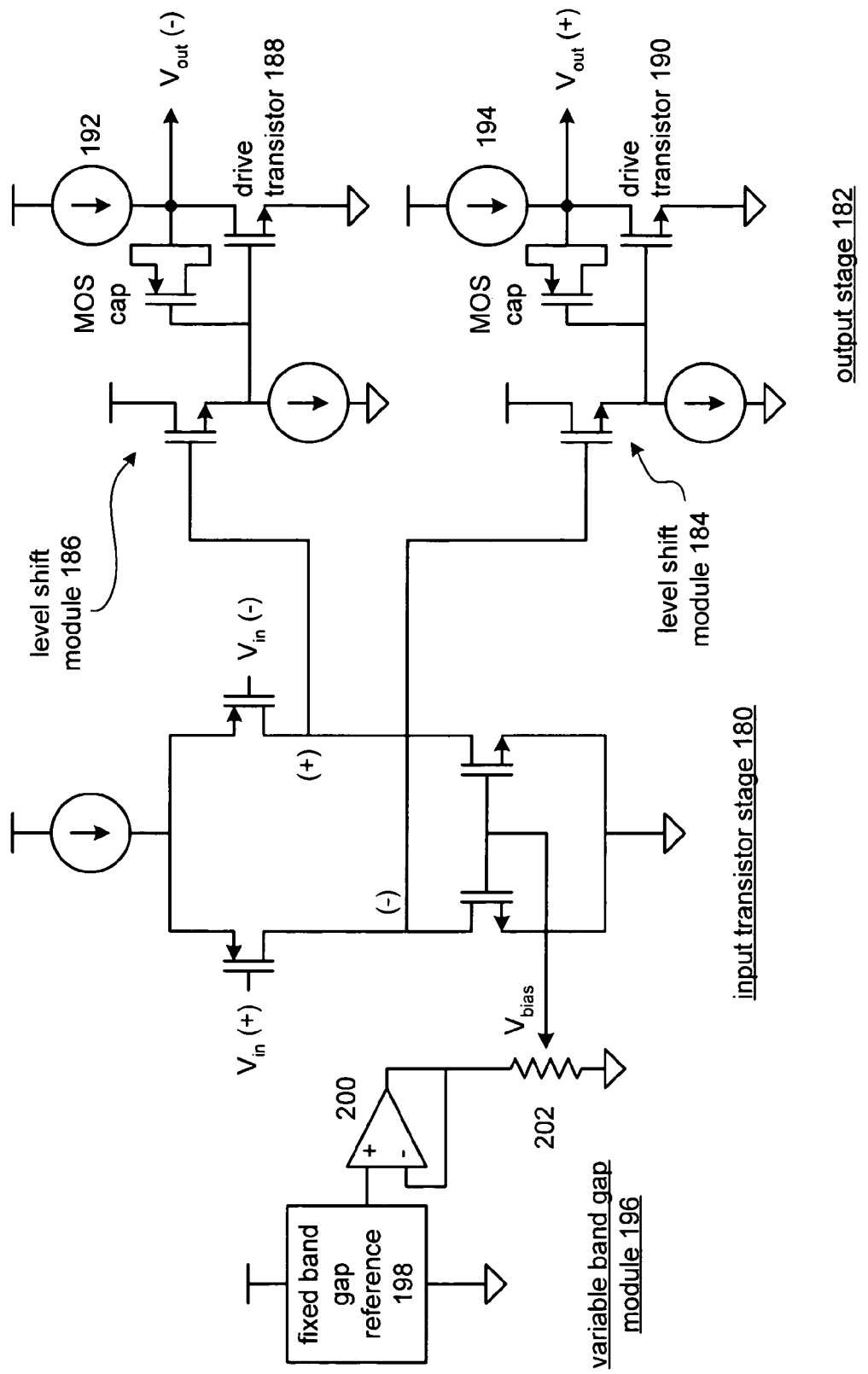
FIG. 10 is a schematic block diagram of an operational amplifier in accordance with one embodiment of the present invention.

FIG. 10 is a schematic block diagram of operational amplifier 150 that may be used in the digital-to-analog converter 72. It is to be noted that the operational amplifier 150 may have a multitude of uses beyond use in a digital-to-analog converter. The operational amplifier 150 includes a variable band-gap module 196, an input transistor stage 180 and an output stage 182. The variable band-gap gap module 196 includes a fixed band-gap reference 198, a unity gain amplifier 200 and a variable impedance 202. In general, the variable band-gap module 196 allows for a lower bias voltage ($V_{bias}$) to be generated when the integrated circuit including the operational amplifier 150 is operated from lower supply voltages.

The fixed band-gap reference 198 generates a fixed reference voltage (e.g., 1.25 volts) from a supply voltage (e.g., 1.8 volts, 3.3 volts, 1.2 volts, et cetera). The unity gain amplifier 200 mimics the fixed voltage reference and provides it to the variable impedance 202. By tuning the variable impedance 202, the bias voltage may range from the fixed reference voltage down to near 0 voltage. Accordingly, in an operational amplifier, such as the one illustrated in FIG. 10, when the supply voltage is relatively low (e.g., 1.8 volts or less), tuning the bias voltage to equate to approximately ½ of the supply voltage provides better dynamic range for the operational amplifier.

The input transistor stage 180 includes two P-channel transistors and two N-channel transistors. The N-channel transistors are gated based on the bias voltage where the P-channel transistors receive a differential input signal. The input stage 180 produces a differential output indicated by the + and − signs that is provided to the output stage 182.

The output stage includes for each leg of the differential signal produced by the input stage, a level shift module 184–186, a drive transistor 188–190, a current source 192–194, and a MOS capacitor (MOS cap). The MOS cap provides feed-forward compensation for the drive transistors 188 and 190 to improve the performance of the output stage 182. In prior art embodiments, the capacitor across the drive transistors were metal capacitors. As is known in the art, the size of a metal capacitor is significantly greater than the size of a MOS cap but the capacitance value of a MOS cap varies as its operating conditions (e.g., as gate-threshold voltage [$V_T$] changes) change, where the capacitance of a metal capacitor is stable with respect to the voltage applied to it. Since the capacitance value of the feedforward capacitor significantly contributes the frequency response of the output stage, a relatively stable capacitance is desired.

To achieve a relatively stable capacitance for a MOS cap in the output stage 182, the output stage includes level shift modules 184 and 186, which bias their respective MOS caps at a greater threshold voltage such that the MOS caps operate in a more linear capacitance range. With the MOS caps operating in a more linear range, the desired feed-forward compensation across the drive transistors 188 and 190 is more predictable. As shown, the level shift modules 184 and 186 include an N-channel transistor and a current source.

Figure 11:
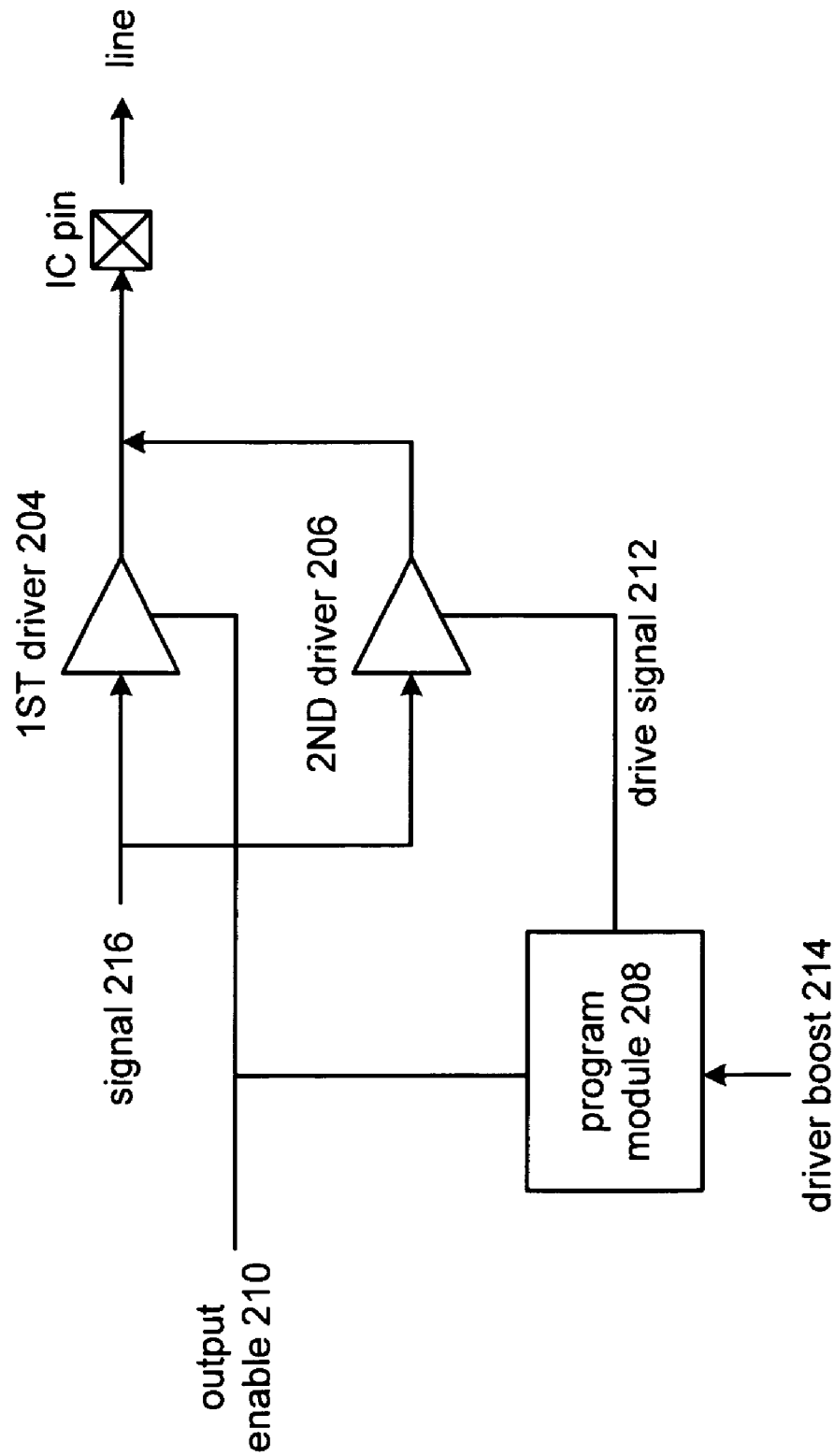
FIG. 11 is a schematic block diagram of a programmable driver in accordance with one embodiment of the present invention.

FIG. 11 illustrates a schematic block diagram of a programmable driver 92. The programmable driver 92 includes a program module 208, a $1^{st}$ driver 204 and at least a $2^{nd}$ driver 206. As shown, the $1^{st}$ driver 204 is operably coupled to receive a signal 216 and, when the output enable signal 210 is active, to drive the signal 216 to a line via an integrated circuit pin. The program module 208, based on a drive boost signal 214 enables or disables the $2^{nd}$ driver 206 via the drive signal 212. Accordingly, when the drive signal 212 enables the $2^{nd}$ driver 206, the $1^{st}$ and $2^{nd}$ drivers 204 and 206 drive the signal 216 in parallel thus providing a greater output power to drive the line via the integrated circuit pin. The driver boost signal 214 may be determined based on the load requirements at the IC pin. The load requirements may be dependent on the particular impedance on the line, which may be the impedance of headphones coupled and further varies based on desired volume setting, et cetera. In addition, the determination of the driver boost signal 214 may be based on output signal strength settings.

It is to be noted that the programmable driver 92 may include multiple drivers in parallel with the $1^{st}$ driver 204 each being individually gated by program module 208. For example, the $1^{st}$ driver 204 may be a 4 milliamp driver, the $2^{nd}$ driver may be a 4 milliamp driver, the $3^{rd}$ driver may be an 8 milliamp driver such that, in combinations, a 4 milliamp output may be obtained, an 8 milliamp output may be obtained, a 12 milliamp output may be obtained, or a 16 milliamp output may be obtained.

FIG. 12 illustrates a schematic block diagram of a microphone bias circuit 96, which reduces noise injected into an audio input signal injected by the supply voltage and other sources of noise. The microphone input signal may be very susceptible to noise, which corrupts the corresponding audio input signal.

The microphone bias circuit 96 includes a unity gain amplifier 220, an on-chip variable resistor and two integrated circuit pins. Off-chip, the microphone couples to one integrated circuit pin and also off-chip a resistor-capacitor filter is included to provide part of the biasing. In combination with the on-chip resistor, the off-chip RC filter provides the desired biasing and filtering of the audio input signal.

Figure 13:
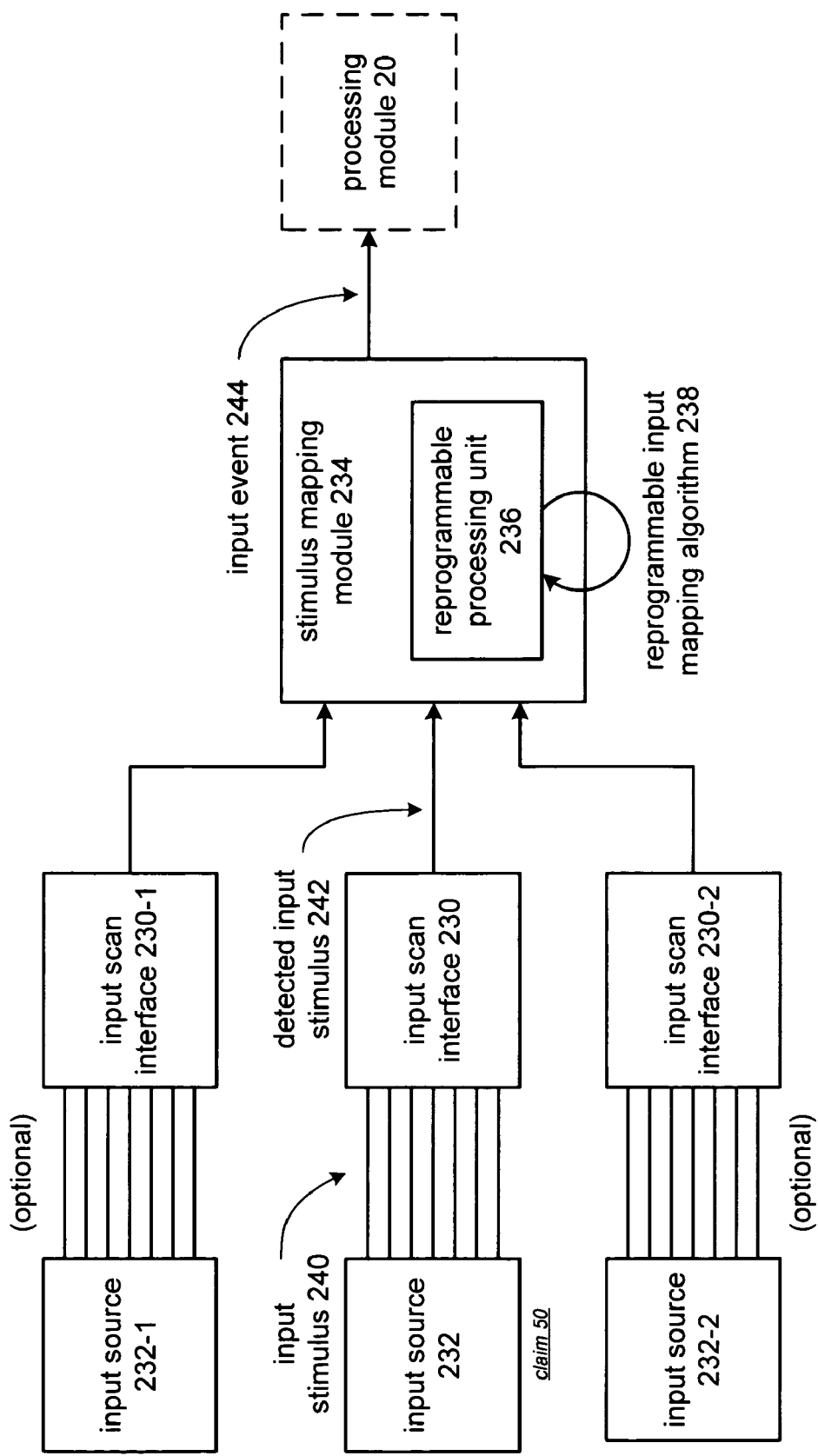
FIG. 13 is a schematic block diagram of an input interface system in accordance with one embodiment of the present invention.

FIG. 13 is a schematic block diagram of the input interface module 90 of an integrated circuit that is operably coupled to receive input stimuli. The input interface 90 includes at least one input scan interface 230, 230-1 and 230-2, and a stimulus mapping module 234. The stimulus mapping module 234 is operably coupled to the processing module 220, which processes the corresponding input commands. Each of the input scan interfaces 230 through 230-2, are operably coupled to an input source 232 through 232-2. The input sources 230 through 232-2 may be a keypad, a joystick, a mouse, a spin ball, an infrared receiver, a serial input port, a radio frequency receiver, a touch screen, et cetera. The corresponding input source produces an input stimulus 240. For example, if the input source 230 is a keypad, when one of the buttons is pushed, a corresponding input stimulus 240 is generated.

The input scan interface 230 receives the input stimulus 240 and generates a corresponding detected input stimulus 242. For example, if the input source 232 is a keypad, and a particular button on the keypad is activated, the input scan interface 230 interprets the particular button that has been activated and provides the indication that that particular button, as the detected input stimulus 242, has been activated to the stimulus mapping module 234.

The stimulus mapping module 234, which may include a reprogrammable processing unit 236, executes a input mapping algorithm 238, which may be reprogrammable, to produce an input event 244. For example, if the input stimulus is a keypad, and a particular button is pushed, the stimulus mapping module 234 interprets which particular button was pushed to generate an input event 244. As a further example, the particular button may be interpreted to correspond to a fast-forward function, pause function, skip function, reverse function, rewind function, play function, volume adjust function, mode select function, record, playback, file storage, et cetera. As such, when the button is activated, the mapping module 234 interrupts the button activation and generates the appropriate input event.

By allowing the stimulus mapping module 234 to interpret the particular stimulus, as opposed to having a direct affiliation of a particular input stimulus to a particular input command, users of the integrated circuit and handheld device manufactures may customize the configurations of its input sources and subsequently change them without hardware modifications to the handheld device. Accordingly, if an input source is changed, the input mapping algorithm 238 is reprogrammed to adjust to the new configuration of the input source without hardware change.

Figure 14:
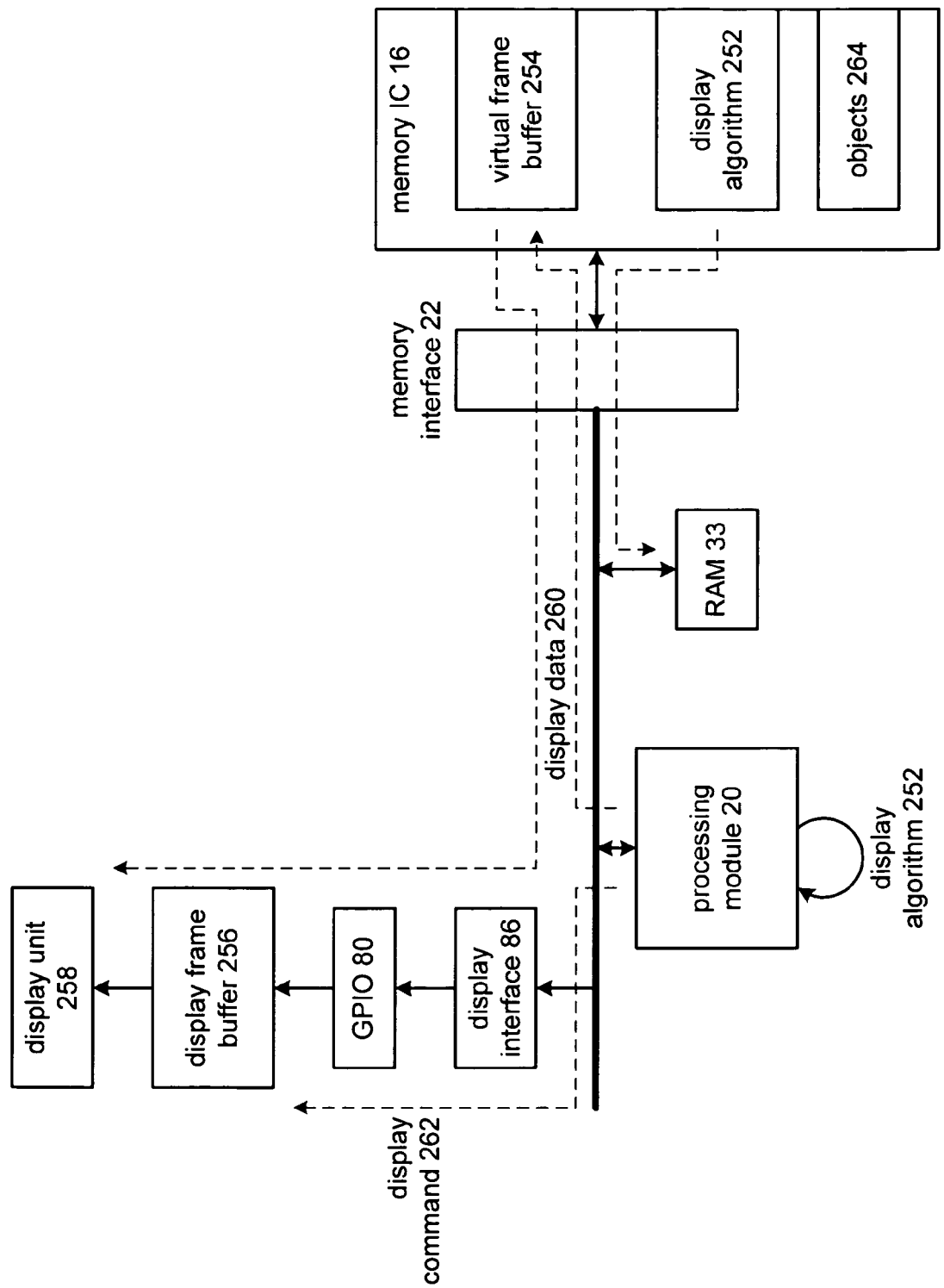
FIG. 14 is a schematic block diagram of a display interface system in accordance with one embodiment of the present invention.

FIG. 14 is a schematic block diagram of a display interface system 250 that may be used in a handheld device in accordance with the present invention. The display interface system 250 includes a display unit 258, display frame buffer 256, the GPIO 80, a display interface 286, the processing module 20, RAM 33, memory interface 22, and memory integrated circuit 16. The memory integrated circuit 16 includes a plurality of memory sections. One memory section may be used as a virtual frame buffer 254, another may store a display algorithm 252 and a $3^{rd}$ may store objects 264. The objects may correspond to display data, such as text overlays, texture maps, and/or any other pre-stored object information that is desired to be displayed as background, foreground, or combination thereof.

To produce a corresponding display on display unit 258, which may be an LCD display module, LED display, plasma, et cetera, the processing module 20 executes the display algorithm 252. The display algorithm 252 may correspond to playback of audio data, video data, text data, displaying selections of input commands, et cetera. While executing the display algorithm 252, the processing module 20 generates display data 260 that is temporarily stored in the virtual frame buffer 254. When a full frame of data is stored in the virtual frame buffer 254, it is retrieved and provided to the display frame buffer 256 for subsequent display. While display data 260 is being stored in the virtual frame buffer 254, the processing module 20 while executing the display algorithm 252 may manipulate the data within the frame buffer 254 in a variety of ways. For example, the display algorithm 252 may cause the processing module 20 to generate a particular background scene from objects 264 to be stored in the virtual frame buffer 254, to generate an overlay of text, images, et cetera and/or a combination thereof. In addition, the display algorithm 252 may cause a morphing of objects 264 among themselves, with the display data, et cetera. Accordingly, by utilizing a virtual frame buffer 254, the display data 260 may be manipulated in a variety of ways to achieve a desired display.

In addition to producing the display data 260, the processing module 20 also generates a display command 262. The display command 262 is provided to the display frame buffer 256 to control when and how the display data 260 is to be provided from the display frame buffer 256 to the display unit 258. Accordingly, the refreshing of display unit 258 may be done under the control of the processing module 20 at a desired rate or varied rate depending on the particular effects of the display desired.

Figure 15:
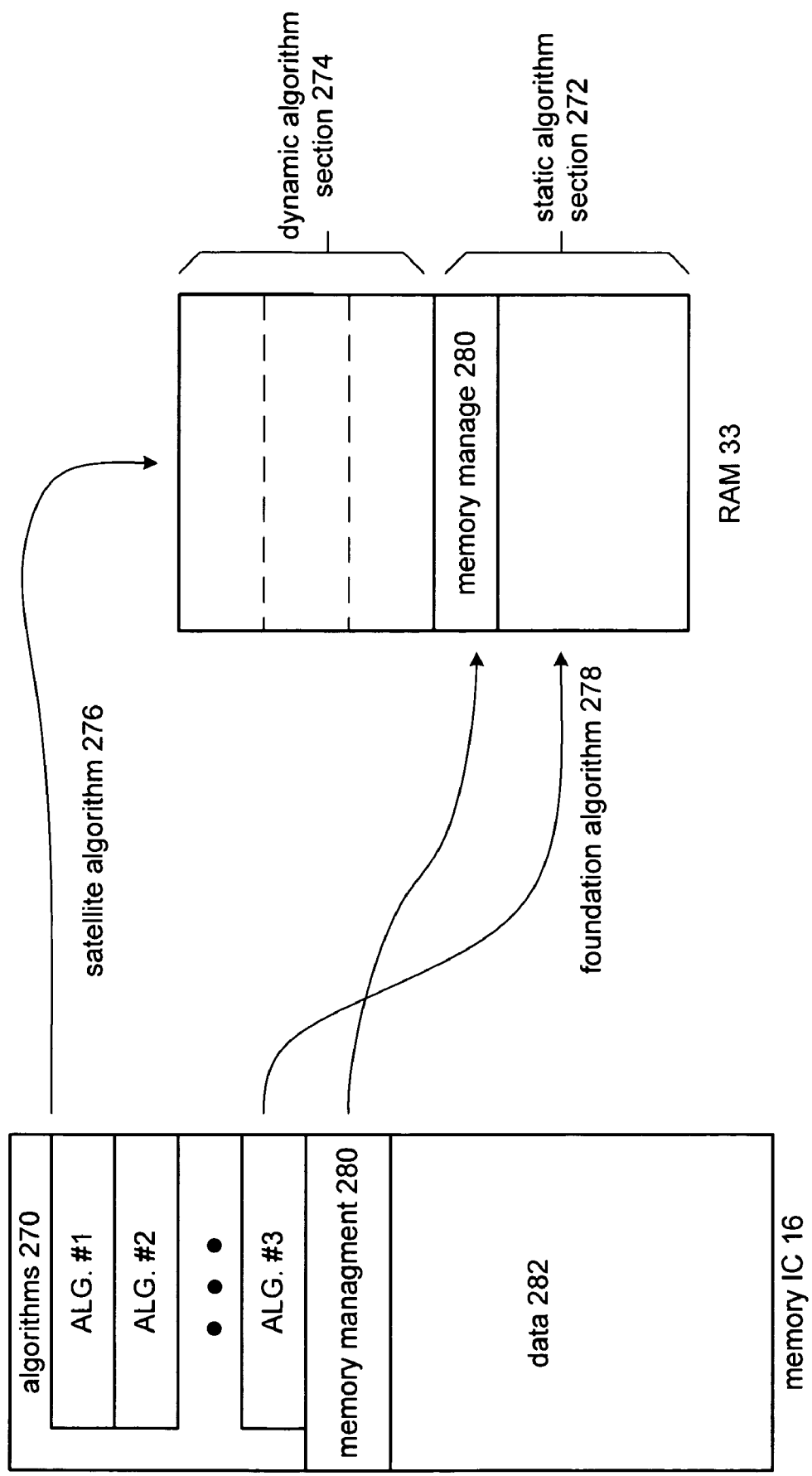
FIG. 15 is a diagram of a memory system in accordance with one embodiment of the present invention.

FIG. 15 is a diagram illustrating the memory functionality of the handheld device 10 or 40. As shown, the memory IC 16, which is off-chip memory with respect to the system-on-a-chip integrated circuit 12, 12-1, 12-2, 12-3, includes a data section 282, a management memory section 280 and an algorithm section 270. The algorithm section 270 stores a plurality of algorithms for retrieval and subsequent execution by the system-on-a-chip integrated circuit. The algorithms may include operational instructions, overlays, functional sub-routines, foundation algorithms, satellite algorithms, etc. In addition, one or more algorithms may constitute an application. For example, an application may be file storage, MP3 playback, MP3 record, WMA playback, et cetera.

The on-chip RAM 33 includes a static algorithm section 272 and a dynamic algorithm section 274. The static algorithm section 272 stores the memory management algorithm 280, which coordinates the retrieval of algorithms 270 from memory IC 16. and may further coordinate the retrieval of data 282 from the memory integrated circuit 16. The static algorithm section 272 further stores foundation algorithms 278. A foundation algorithm is an algorithm that stays within RAM 33 for a relatively long period of time and may call satellite algorithms during execution, including based on external stimuli such as pause, fast-forward, et cetera. For example, a foundation algorithm 278 may correspond to MP3 decode algorithm, WMA decode algorithm, et cetera. A satellite algorithm 276 is one that is stored a much shorter time in RAM 33 with respect to a foundation algorithm 78 and is generally called by a foundation algorithm. For example, a satellite algorithm 276 may include data mixing, display processing algorithm, a menu algorithm and/or sub-menu algorithms.

The dynamic algorithm section 274 may be partitioned to store varying levels of satellite algorithms 276. For example, one section of the dynamic algorithm section 274 may store satellite algorithms that are rapidly replaced, another section that stores satellite algorithms that are less rapidly replaced, et cetera.

The algorithms stored in the memory integrated circuit 16 may correspond to a file system algorithm, a host system interface algorithm (e.g., such as a USB interface algorithm), an audio playback algorithm, a video playback algorithm, an audio record algorithm, a video record algorithm, and/or a text presentation algorithm. The algorithms may correspond to functional coding blocks that are retrieved only when needed. This will be further illustrated with respect to FIG. 16.

The memory integrated circuit 16 may be a NAND flash memory, which, as is known, is well suited for bulk storage of data but not for high-speed retrieval of data. Accordingly, by utilizing a NAND flash memory as the system memory for a handheld device, the retrieval of data and/or algorithms from the system memory is prioritized over the processing efficiency of the processing module. By prioritizing the retrieval of data and/or algorithms from the system memory over processing efficiency of the processing module reduces power consumption of the functional integrated circuit.

Since the RAM 33 may store in the same locations multiple algorithms, debugging and/or testing the proper functionality of the handheld device is difficult. To reduce this difficulty, each of the algorithms stored in the memory integrated circuit 16 include a unique application identification code. This identification code is utilized by an external debugger device to retrieve the corresponding source code of the algorithm stored in the RAM at any given time. It is to be noted that the memory integrated circuit 16 and hence the RAM 33, stores the algorithms in an object code. For human debugging of a system and/or testing of the system, it is desirable to present source code of the corresponding algorithm. To enable a debugger to provide the appropriate source code, it uses the unique application identification code of the corresponding algorithm stored in RAM 33 to retrieve the appropriate source code.

Figure 16:
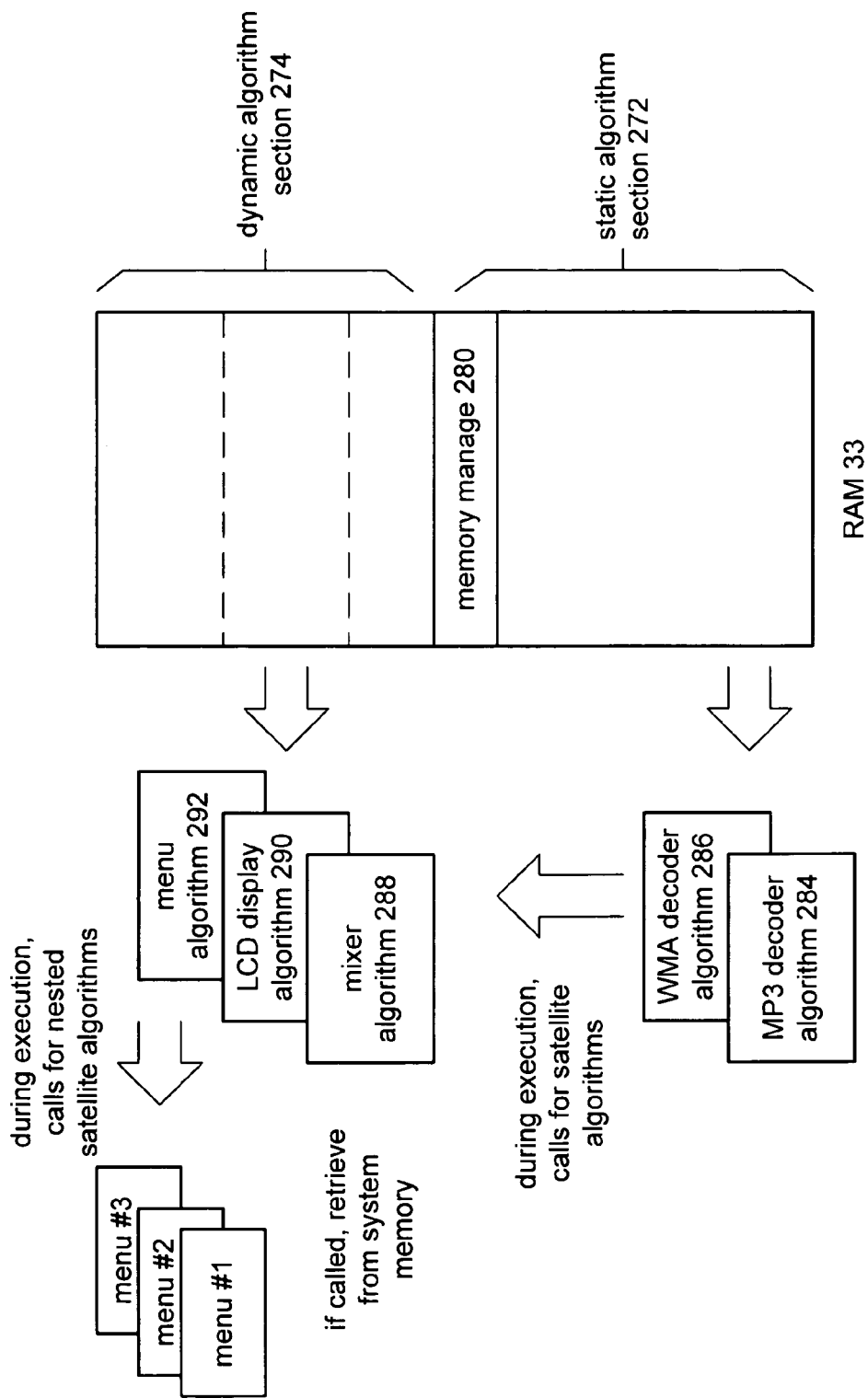
FIG. 16 is a diagram of a program random access memory in accordance with one embodiment of the present invention.

FIG. 16 is a diagram illustrating an example of the use of on-chip RAM 33. As shown, the RAM 33 includes a static algorithm section 272 and a dynamic algorithm section 274. Within the static algorithm section 272, the RAM 33 stores the memory management algorithm 280, which coordinates the retrieval of foundation and satellite algorithms from the system memory IC 16. In this example, a foundation algorithm may be an MP3 decoder algorithm 284 and/or a WMA decoder algorithm 286. Such decoder algorithms 284 and 286 would be stored in the static algorithm section 272 of RAM 33. These algorithms are considered foundation algorithms since as long as the handheld device is in a playback mode, these algorithms may be used.

During the execution of a decoder algorithm 284 or 286, it may call for a satellite algorithm. Such a satellite algorithm may be a mixer algorithm 288, an LCD display algorithm 290 and/or a menu algorithm 292. For example, during the playback of a MP3 file, the user of the handheld device may issue a pause command. For the processing of this pause command, the MP3 decoder would retrieve the LCD display algorithm 290 which, when processed causes a pause function to be displayed on the display. In addition, a corresponding pause function may be retrieved such that the playback is paused until an input stimulus reactivates playback or some other input stimulus is obtained.

In addition, during the execution of the decoder algorithm 284 or 286, the user may request for display of a menu. In this instance, the decoder algorithm 284 or 286 would call the satellite algorithm corresponding to menu algorithm 292. The menu algorithm 292, in turn may retrieve a plurality of nested satellite algorithms corresponding to particular menus. For example, the menu algorithm 292 may include a plurality of topics from which the user may select. Once a particular topic is selected, the corresponding menu, which provides the individual selections for that topic, is retrieved and subsequently provided to the user. As additional satellite algorithms are retrieved from memory, they are stored in the dynamic algorithm section 274 by overriding existing satellite algorithms that are no longer in use or no longer immediately needed. As such, the use of the system memory in conjunction with RAM 33 in this manner, allows the handheld device to execute a variety of applications and have such applications reprogrammed or new applications installed, without hardware change to the memory structure of the system-on-a-chip integrated circuit in an optimal manner that reduces power consumption. Further discussions of the operations of memory 16 and RAM 33 are set forth in detail in reference to FIGS. 29–34.

Figure 17:
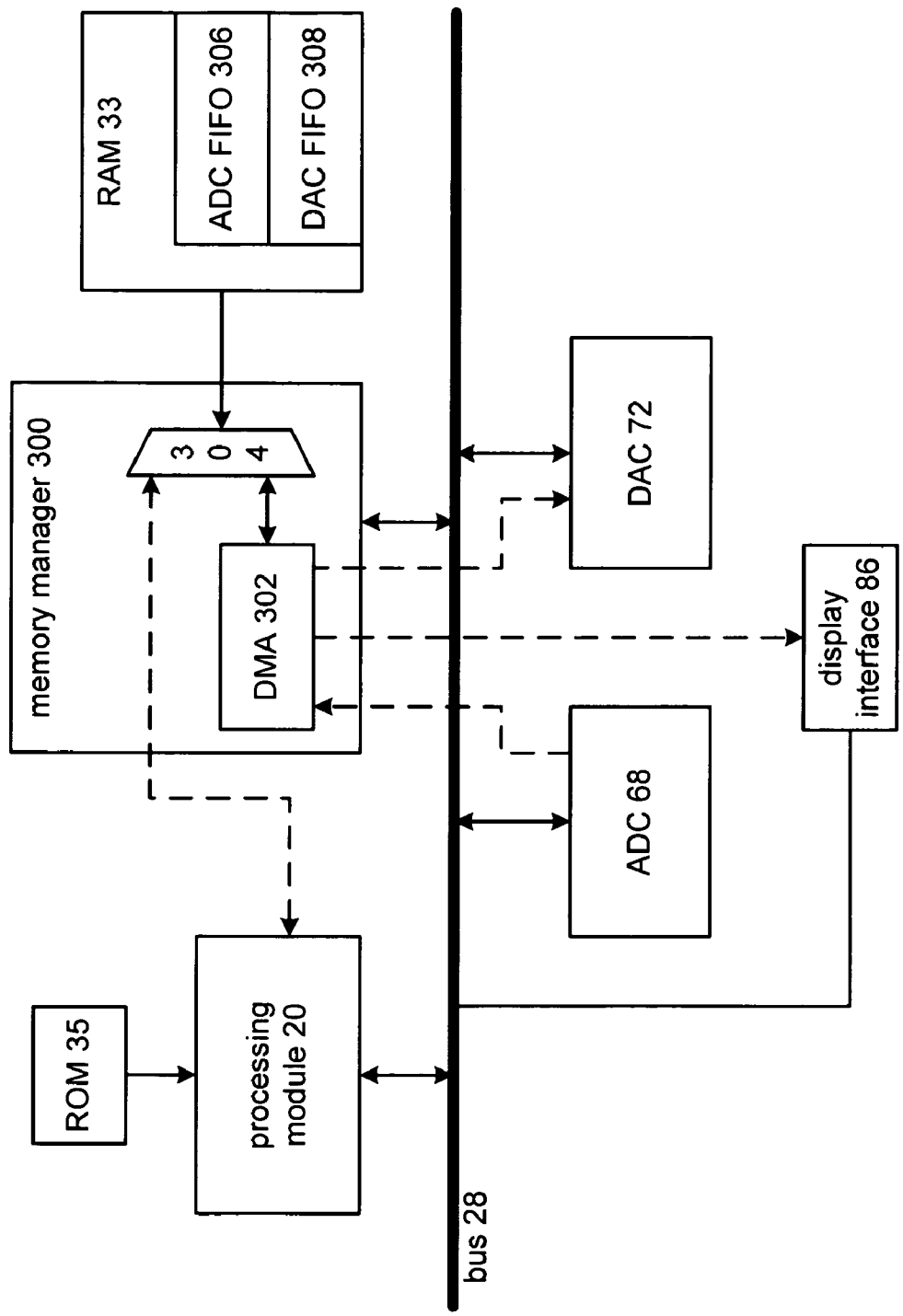
FIG. 17 is a schematic block diagram of another memory system in accordance with one embodiment of the present invention.

FIGS. 17 is a schematic block diagram illustrating memory access of RAM 33. In this illustration, RAM 33 functions as an L2 cache or L1 cache for processing module 20 and further functions as a first-in-first-out buffer for the analog-to-digital converter and digital-to-analog converter. The memory manager 300, which may include a direct memory access device 302 and a multiplexer 304 controls the access to RAM 33. The multiplexer 304, provides access to RAM 33 among the processing module 20 and the DMA module 302. The DMA module 302 arbitrates access to RAM 33 between the analog-to-digital converter 68, the digital-to-analog converter 72 and the display interface 86. For example, when the analog-to-digital converter 68 is producing digital information, the DMA module 302, via multiplexer 304, provides a path for the analog-to-digital converter 68 to write the digital data into the analog-to-digital converter first-in-first-out section 306 of RAM 33. Similarly, when the digital-to-analog converter 72 is to convert digital data to analog data, it retrieves the data from the DAC FIFO section 308 via the memory manager. The display interface 86 may also retrieve data for display from RAM 33 via the memory manager 300.

By utilizing a single RAM 33 on-chip for multiple functions as opposed to separate RAMs for each function, the overall size of the RAM is reduced, thus reducing the overall size of the system-on-a-chip integrated circuit.

FIG. 18 illustrates a schematic block diagram of the DC to DC converter 26. As shown, the DC to DC converter 26 includes a regulation module 310, a source transistor 33, output transistors T1 and T2, gate logic module 312, output capacitor C1 and C2, an off-chip conductor L and battery 14. In operation, the DC to DC converter 26 produces a $1^{st}$ and $2^{nd}$ output voltage $V_{DD1}$ and $V_{DD2}$. In this configuration, the DC to DC converter 26 is acting in a boost mode. Accordingly, during one phase of a regulation cycle, the regulation module 310 activates transistor T3 and keeps transistors T1 and T2 off. In this configuration, energy is built up across inductor L. During a next interval of the regulation cycle, the regulation module 310 activates either transistor T1 or transistor T2. If, for example, T1 is activated, at least some of the energy stored in inductor L is provided via T1 to capacitor C1 to produce output $V_{DD1}$. Alternatively, when transistor T2 is activated, the energy from the inductor is provided to capacitor C2 to produce output $V_{DD2}$.

If, for example, output $V_{DD1}$ is 3.3 volts and output $V_{DD2}$ is 1.8 volts, without the gate logic module 312, transistor T2 would be required to be a 3.3 volt transistor. It is to be noted that the gate oxide layer of a transistor in addition to its length and width, may need to be increased as the operating voltage increases. Accordingly, a 1.8 volt transistor may be approximately $\frac{1}{4}^{th}$ the size of a 3.3 volt transistor. Further, the operational characteristics of a 3.3 volt transistor in comparison to a 1.8 volt transistor are slower, with respect to turning on and turning off and also has a greater impedance. As the operating rates of a DC to DC converter increase, a 3.3 volt transistor may be ineffective for use on a 1.8 volt output. To overcome this issue, a gate logic module 312 is used to gate transistor T2. By utilizing the gate logic module 312, transistor T2 may be a 1.8 volt transistor for example. The gate logic module functions as illustrated in the truth table illustrated in FIG. 18. For example, if transistor T1 is on, the gate logic module 312 sets the gate and well voltage of transistor T2 to be $V_{DD1}$. If transistor T1 is off and transistor T3 is on, the gate logic module 312 sets the gate and well voltage of transistor T2 to $V_{DD2}$. If transistor T1 is off and transistor T2 is on, the gate logic module 312 sets the gate and well voltage of transistor T2 to 0 volts thus turning transistor T2 on.

FIG. 19 illustrates a logic diagram of a method that may be implemented by the regulation module 310 to provide current limiting for the DC to DC converter 26. The process begins at Step 320 where the regulation module determines a current loading duty cycle of an output of the DC to DC converter. With reference to FIG. 20, the current loading duty cycle of an output of a DC to DC converter corresponds to the particular current being drawn and the adjusted duty cycle to support that load. As shown in FIG. 20, when 0 current (i.e., no load) is placed on the particular output, the duty cycle corresponds to $(V_{out}-V_{bat})/V_{out}$. As load is applied to this particular output, the duty cycle is represented by the equation $(V_{out}-V_{bat}+I*R_T)/V_{out}$, where $R_T$ corresponds to the impedance of the corresponding switching transistor (e.g., T1 or T2). Accordingly, the particular current being drawn could have a corresponding duty cycle based on the impedance of the resistor.

Returning to the logic diagram of FIG. 19, the process proceeds to Step 322 where the current loading duty cycle is compared with a zero loading duty cycle of the output. The process then proceeds to Step 324 where a determination is made as to whether the current loading duty cycle exceeds the zero loading duty cycle plus a duty cycle loading offset. The duty cycle loading offset corresponds to the desired current limit setting. Again with reference to FIG. 20, the duty cycle loading offset corresponds to the $I*R_T$ component of the duty cycle with load. If the current loading does not exceed the zero current loading plus the duty cycle offset, the process proceeds to Step 326 where no current limiting is applied.

If, however, the current loading duty cycle exceeds or equals the zero loading duty cycle plus a duty cycle loading offset, the process proceeds to Step 328. At Step 328 the duty cycle is limited for the corresponding output based on the zero loading duty cycle plus the duty cycle loading offset. For example, with reference to FIG. 20, as the load increases from zero, the graph is followed. Once the duty cycle reaches the zero duty cycle plus the loading offset, the current will be at a particular level (i.e., I limit). At this point, the duty cycle is clamped to this value thus clamping the current to this corresponding level.

Figure 21:
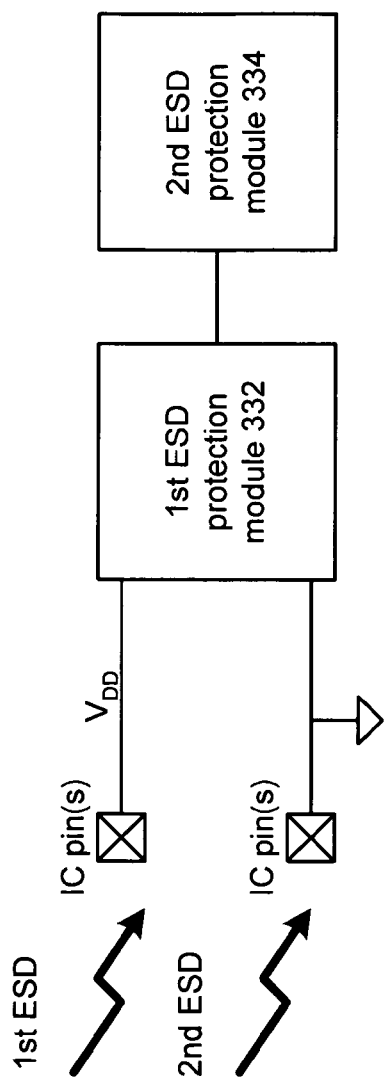
FIG. 21 is a schematic block diagram of an electrostatic protection circuit in accordance with one embodiment of the present invention.

FIG. 21 illustrates a schematic block diagram of an electrostatic discharge (ESD) protection circuit 330 that may be incorporated in the system-on-a-chip integrated circuit 12. The ESD protection circuit 330 includes a $1^{st}$ ESD protection module 332 that is coupled to pins of the integrated circuit. The ESD protection circuit 330 also includes a $2^{nd}$ ESD protection module 334. The $1^{st}$ ESD protection module 332 protects against a $1^{st}$ type of ESD event, which corresponds to when the integrated circuit is not operational and not installed on a printed circuit board. Such ESD protection is required to protect against a 2 kilovolt surge.

The $2^{nd}$ ESD protection module 334 is operably coupled to protect the integrated circuit from a $2^{nd}$ type of ESD event when the integrated circuit is operational and/or installed on a printed circuit board. Such protection may protect against a 15 kilovolt surge.

Figure 22:
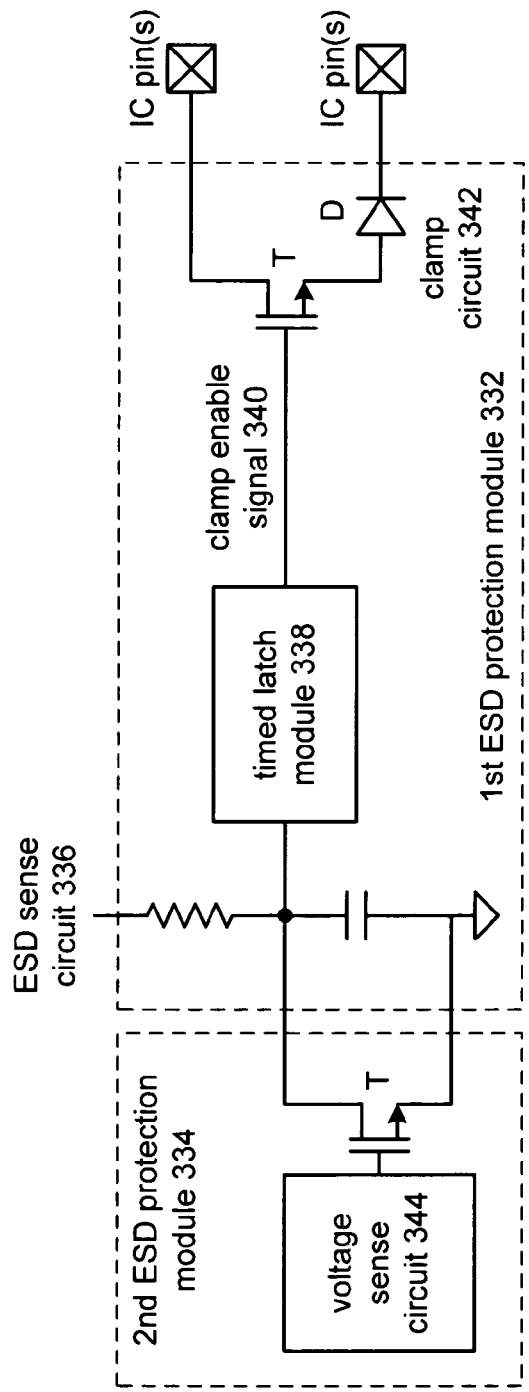
FIG. 22 is a schematic block diagram of another electrostatic protection circuit in accordance with one embodiment of the present invention.

FIG. 22 illustrates a schematic block diagram of an alternate ESD protection circuit 335. The ESD protection circuit 335 includes the $1^{st}$ ESD protection module 332 and the $2^{nd}$ ESD protection module 334. The $1^{st}$ ESD protection module 332 includes an ESD sensing circuit 336, which includes a resistor and capacitor, a timed latch module 338, and a clamping circuit 342. The clamp circuit 342 includes a transistor and may further include an optional diode. When a $1^{st}$ type of ESD event is sensed via the ESD sense circuit 336, and the $2^{nd}$ ESD protection module 334 is disabled, a voltage is imposed across the capacitor triggering the timed latch module 338. The timed latch module 338 generates a clamp enable signal 340 for a particular duration of time (e.g., a few milliseconds to a few seconds) to enable the clamp circuit 342. With the clamp circuit 342 enabled, energy of the ESD event on the integrated circuit pins is substantially dissipated via the clamp circuit 342.

Once the integrated circuit is installed on a printed circuit board, the $2^{nd}$ ESD protection module 334 may be activated. The $2^{nd}$ ESD protection module 334 includes a transistor T and a voltage sense circuit 344. The voltage sense circuit senses whether a supply voltage is present. When a supply voltage is present, transistor T is enabled, which is coupled across the capacitor of the ESD sense circuit 336 of the $1^{st}$ protection module 332. As such, the $2^{nd}$ ESD protection module 334 substantially disables the $1^{st}$ protection module 332 to prevent the shut down of the integrated circuit through latching of the $1^{st}$ ESD protection module. Typically, the installation of an integrated circuit on a printed circuit board will provide sufficient ESD protection to protect against a $2^{nd}$ type of ESD event.

Figure 23:
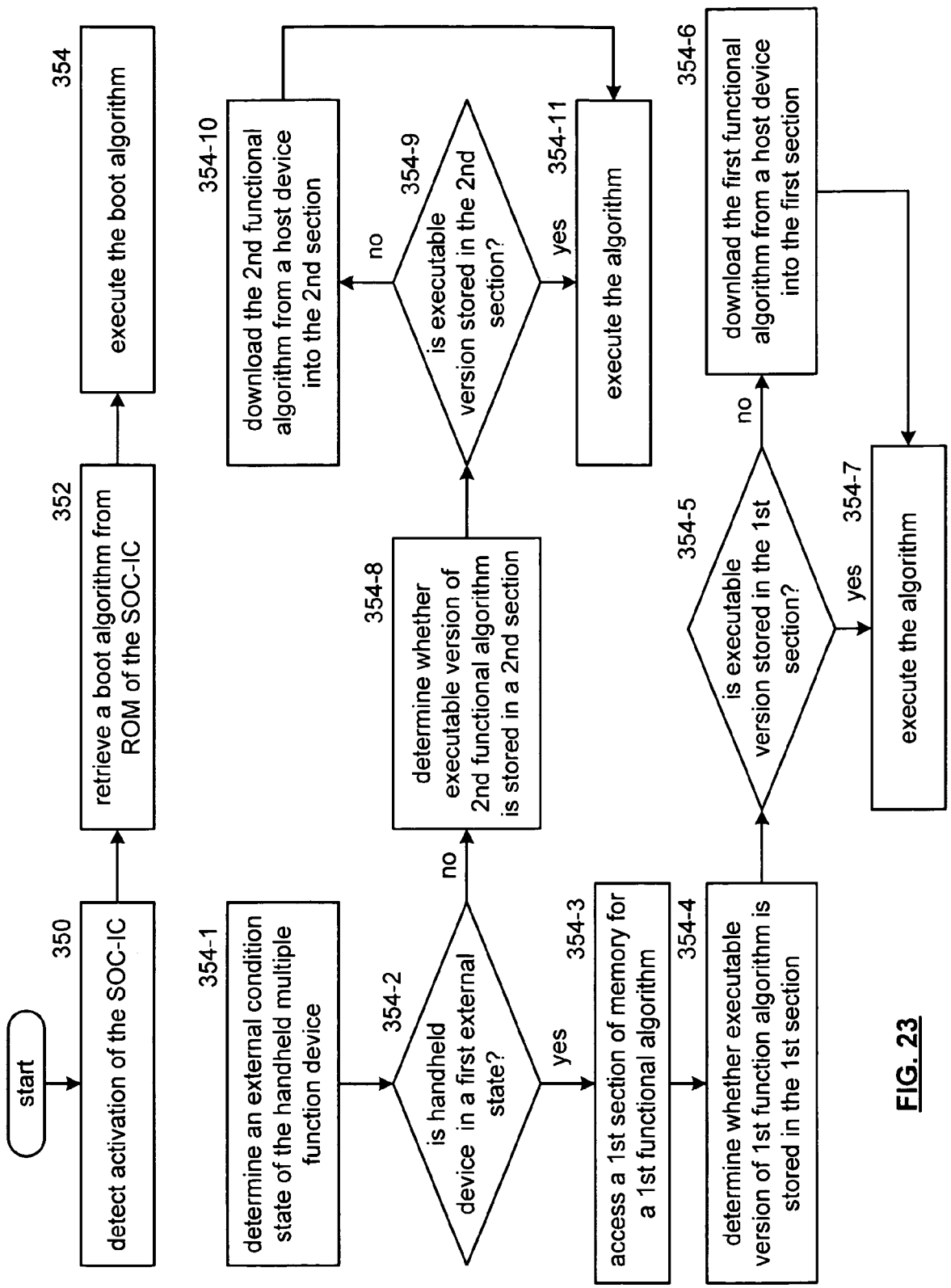
FIG. 23 is a logic diagram of a method for loading and/or programming a system on a chip in accordance with one embodiment of the present invention.

FIG. 23 is a logic diagram of a method for booting up, and/or programming a system-on-a-chip integrated circuit that is used in a handheld multiple function device. The process begins at Step 350 where activation of the system-on-a-chip integrated circuit is detected. This may also include the detection of a reset of the system-on-a-chip. For example, to activate a reset of the system-on-a-chip, the play button of the handheld device may be held for 5 seconds. Having detected the activation of the system-on-a-chip, the process proceeds to Step 352 where a boot algorithm is retrieved from on-chip ROM of the system-on-a-chip. The process then proceeds to Step 354 where the boot algorithm is executed.

Processing Steps 354-1 through 354-11 illustrate the execution of the boot algorithm. At Step 354-1 an external condition state of the handheld functional device is determined. The external condition may correspond to the device being coupled to a host or not coupled to a host. The process then proceeds to Step 354-2 where a determination is made as to whether the device is in a $1^{st}$ external state. The $1^{st}$ external state may correspond to when the device is a portable unit and a $2^{nd}$ external state may correspond to when the handheld device is coupled to a host. If the device is in a $1^{st}$ external state (e.g., is functioning as a portable device) the process proceeds to Step 354-3. At Step 354-3 a $1^{st}$ section of memory is accessed for a $1^{st}$ functional algorithm. For example, the $1^{st}$ functional algorithm may correspond to MP3 playback, voice dictation record, WMA playback, et cetera. The process then proceeds to Step 354-4 to determine whether an executable version of the $1^{st}$ functional algorithm is stored in the $1^{st}$ section of the system memory of the handheld device. An executable version is one that is stored and is not corrupted.

The process then proceeds to Step 354-5 where the processing branch is based on whether an executable version is stored in the $1^{st}$ section. When the executable version is not stored, the process proceeds to Step 354-6 where the $1^{st}$ functional algorithm is downloaded from a host device into the $1^{st}$ section of memory. To download the $1^{st}$ functional algorithm, the handheld device is coupled to the host device.

If the $1^{st}$ version is executable and/or has been downloaded and is thus executable, the process proceeds to Step 354-7 where the $1^{st}$ functional algorithm is executed.

If the handheld device is in a $2^{nd}$ external state, the process proceeds to Step 354-8 where a determination is made as to whether a $2^{nd}$ executable version of the functional algorithm is stored in a $2^{nd}$ section of memory. This executable version may correspond to a file storage algorithm, a USB interface algorithm, and/or any other type of algorithm that facilitates the communication between a handheld device and a host device.

The process then proceeds to Step 354-9 where the processing branch is based on whether the executable version of the $2^{nd}$ functional algorithm is stored in a $2^{nd}$ section of the memory of the system memory. If not, the process proceeds to Step 354-10 where the $2^{nd}$ functional algorithm is downloaded from the host device into the $2^{nd}$ section of memory. Once an executable version of the $2^{nd}$ functional algorithm is stored in the system memory, the process proceeds to Step 354-11 where the executable algorithm is executed.

Figure 24:
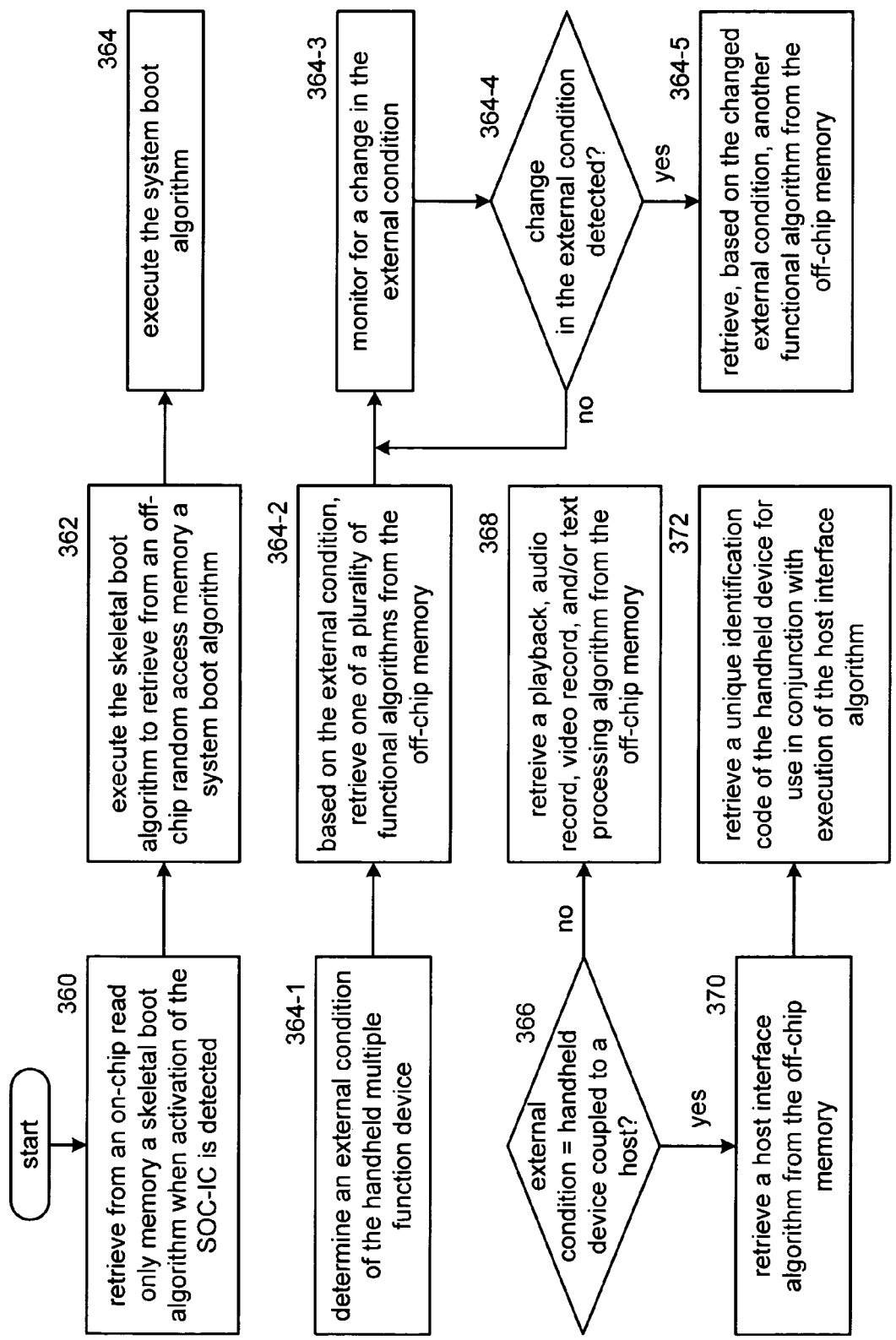
FIG. 24 is a logic diagram of a method for booting up a system on a chip in accordance with one embodiment of the present invention.

FIG. 24 is a logic diagram of a method for booting a system-on-a-chip integrated circuit that may be used in a handheld multi-functional device. The process begins at Step 360 where a skeletal boot algorithm is retrieved from on-chip read-only memory when the system-on-a-chip integrated circuit is activated. The process then proceeds to Step 362 where the skeletal boot algorithm is executed to retrieve from an off-chip RAM a system boot algorithm. The process then proceeds to Step 364 where the system boot algorithm is executed.

The execution of the system boot algorithm is further illustrated with respect to Steps 364-1 through 364-5. At Step 364-1, the processing module of the system-on-a-chip integrated circuit determines the external condition of the handheld multiple function device. This may be done as illustrated with respect to Steps 366–372. At Step 366, the processing unit determines whether the external condition corresponds to the handheld device being coupled to a host. If not, the process proceeds to Step 368 where the processing module retrieves a playback, audio record, video record and/or text processing algorithm from the off-chip system memory.

If, however, the external condition corresponds to the handheld device being coupled to the host, the process proceeds to Step 370. At Step 370, the processing module retrieves a host interface algorithm from the off-chip memory. The process then proceeds to Step 372 where the processing module retrieves a unique identification code of the handheld device for use in conjunction with the execution of the host interface algorithm. For example, if the host interface algorithm corresponds to a USB interface algorithm (e.g., version 1, 2, et cetera), in accordance with the standard, each device has a USB identification code. This code may be stored in the off-chip RAM for ease of manufacturing a USB interface compliant device and used when the USB interface algorithm is executed.

Returning to the execution of the system boot algorithm the process proceeds to Step 364-2. At Step 364-2, the processing unit, based on the external condition, retrieves one of a plurality of functional algorithms from the off-chip memory. The functional algorithm may correspond to a file system algorithm when the device is coupled to a host for facilitating storage of data received from the host or may correspond to a playback algorithm when the handheld device is not coupled to the host.

The process then proceeds to Step 364-3 where the processing module monitors for a change in the external condition. The process then proceeds to Step 364-4 where the processing module branches its functionality based on whether an external condition has changed. If so, the process proceeds to Step 364-5 where the processing module retrieves, based on the external changed external condition, another functional algorithm from the off-chip memory. For example, if the device was in a portable mode, the processing module was executing a playback algorithm or record algorithm et cetera. When the external condition has changed such that the handheld device is coupled to a host, the processing module retrieves a file system algorithm as well as the interface algorithm.

FIG. 25 illustrates a logic diagram of a method for efficient battery use by a handheld multiple function device. The process may begin at Step 380, 382 and/or 384. At Step 380, the device monitors at least one output of a system-on-a-chip for an overload condition. At Step 382, the device monitors a system voltage produced by the DC to DC converter for a system low voltage condition, which indicates that the battery is running out of energy. Note that the overload condition corresponds to a potential short of one of the outputs of the system-on-a-chip, which typically may correspond to a headphone jack short. At Step 384, the device monitors the voltage of the battery for a battery low voltage condition, which may correspond to the battery not being coupled to the handheld device. For example, the battery may fall out of the handheld device. The process then proceeds to Step 386 where the device determines whether an overload condition occurs, a system low voltage condition occurs and/or a battery low voltage is detected. If not, the device continues monitoring as described with respect to Steps 380, 382 and 384. If, however, an overload, system low voltage and/or battery low voltage is detected, the process proceeds to Step 388. At Step 388, the device enables one of a plurality of fail-safe algorithms based on the condition. The fail-safe algorithms are illustrated in FIGS. 26–28.

FIG. 26 illustrates a logic diagram of a method corresponding to an overload fail-safe algorithm. The processing begins at Step 390 where once an overload condition is detected, i.e., a short exists on the output, the at least one output is disabled for a predetermined period of time (e.g., a few milliseconds to a few tens of seconds). The process then proceeds to Step 392 where after expiration of the predetermined period of time, the output is again enabled. The process then proceeds to Step 394 where the monitoring for the overload condition is resumed. In such an overload condition, the output is disabled while the remaining functionality of the chip is kept in tact.

FIG. 27 is a logic diagram of a method illustrating a system low voltage fail-safe algorithm. In this instance, the system is detecting that the battery is running out of energy. When such a condition occurs, the processing begins at Step 396 where at least one of the outputs is disabled to remove the loading on the system-on-a-chip and hence reducing the loading on the battery. The process then proceeds to Step 398 where the current settings corresponding to the execution of a functional algorithm being executed is stored. The process then proceeds to Step 400 where the handheld device is shut down. Accordingly, by shutting the system down in this manner, when the battery is replaced, the execution of the functional algorithm may be picked up where it was left off without requiring the system to be rebooted and/or algorithms to be reloaded from the system memory.

FIG. 28 is a logic diagram of a method for a battery low voltage fail-safe algorithm. This algorithm provides the processing steps corresponding to when the battery voltage drops to zero, which typically occurs when the battery falls out of the device and/or loses contact with the device. The processing begins at Step 402 where essential current settings correspond to the execution of the at least one functional algorithm are stored. These essential settings correspond to which algorithm is being executed and allowing the algorithm to be shut down in a safe mechanism without it locking up. If the algorithm were to lock, the handheld device would be locked and would require external reprogramming to reactivate. The process then proceeds to Step 404 where the boot process is reset.

Hidden Memory Blocks to Store OS Programs

Figure 29:
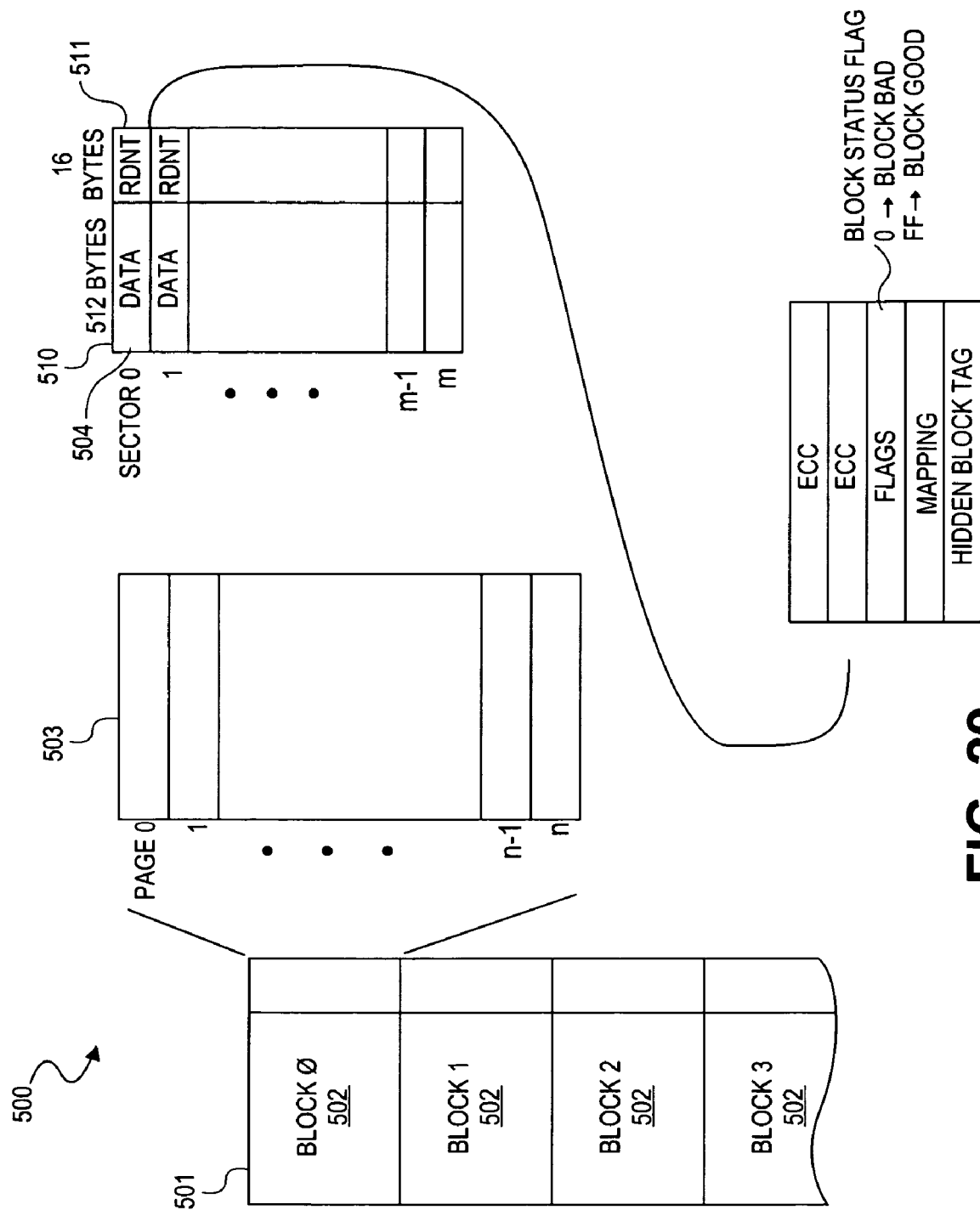
FIGS. 29 is a diagram of an embodiment of a memory system in which a hidden memory block of a data storage medium is used to store a boot program.

As was noted in FIG. 15, memory 16 resides external to the integrated circuit (IC) 12, but still resides within the hand-held device. Typically, algorithms (which may comprise various programs, including application programs) and data may be retained in an external memory device such as memory 16. In one embodiment, memory 16 is also utilized to store system level programs generally referred to as boot programs or routines. As was noted in the background section above, a typical practice is to employ a ROM to store the boot routines. In certain applications, where the boot routine is to be modified or made customizable, the ROM may be replaced by a NOR type flash memory device. However, in the practice of one embodiment to the invention, memory 16 is a NAND type flash memory, which is utilized for the general purpose of retaining data, as well as other programs. In the particular embodiment to practice the invention, the external memory 16 is also utilized to store the boot routines which are accessed at time of initialization to boot up the integrated circuit 12. FIG. 29 illustrates how the boot routine is accessed by the use of hidden blocks in memory 16.

In FIG. 29, an external memory (equivalent to memory 16) is shown as a NAND type flash memory device 501, comprised of a plurality of flash memory blocks 502, of which four of the Blocks 0–3 are shown in the drawing. It is generally understood that memory devices are partitioned into a plurality of blocks and this is also true of flash memory devices. Accordingly, memory 501 may be a NAND flash memory, in which the memory is partitioned into a plurality of blocks 502. Subsequently, the blocks 502 may be further partitioned into a plurality of pages 503, as shown in FIG. 29.

In the particular example 500, "n" number of pages are shown for memory Block 0. Generally, the blocks 502 are partitioned into "n" number of pages 503. Furthermore, the pages 503 may be further partitioned into "m" number of sectors 504. It is to be noted that the size of the various blocks, pages, sectors or the number of pages in a given block or number of sectors in a given page need not be same.

In the particular example 500 shown in FIG. 29, the sectors 504 are separated into a data section 510 and a redundant section 511. The size of the data section 510 and redundant section 511 may vary in size In the particular example 500, the data section 510 is 512-bytes in length, while the redundant section 511 is 16-bytes in length. Again, the size of the data section 510 and the redundant section 511 may differ from embodiment to embodiment. Generally, data is stored within the data section 510 and various other codes, including error correction codes (ECC), flags, mapping bits, etc., may be stored in the redundant section 511.

One of the components stored within the redundancy section 511 is a flag that is used to show the status of the block. That is, if a particular block is diagnosed to be a "bad" block, then the block status flag is set to a value (0 is used in the example of FIG. 29) to designate that the block is bad. Alternatively, if the block is diagnosed as good, then the block status flag will also indicate that the particular memory block is good (flag state FF is shown in FIG. 29). Thus, in typical flash memory operation, the block status flag is checked to determine if that particular block is good or bad and if the block is identified as a bad block, then that block is not utilized for data storage.

In order to store boot routines within the NAND flash 501, an embodiment of the present invention utilizes the block status flag to set a particular block as a hidden block for the boot routines which are then stored in that hidden block. Thus, for example, if Block 0 of FIG. 29 is to be designated as the hidden block for storing the boot routines, the block status flag is set to 0 (or some other indication) to designate that the block is bad. By setting the block status flag to a "block bad" indication, the system will then treat Block 0 as a bad block and not attempt to utilize Block 0 for data storage. Accordingly, Block 0 is removed from the system for use by other system components or units, such as integrated circuit 12.

In order to then utilize the hidden block for boot routine storage, some other indication is then utilized to indicate that this is a hidden boot block and not an actual bad memory block. A variety of indicators may be employed but in one embodiment, a hidden block tag is stored in one of the redundant locations. The hidden block tag in the example is stored within the same redundant section as the block status flag and this tag may be set to a unique value. The hidden block tag is utilized in this example as a unique identifier to signify that this particular hidden block contains the stored boot routines.

Therefore, a hidden block is initially identified as a bad block and if the bad block contains a unique tag, then the particular block is actually a good block used for the storage of boot routines. The use of the block status flag to indicate that the hidden block is bad to the rest of the system ensures that other devices do not write to or access the block which contains the stored boot routines.

Figure 30:
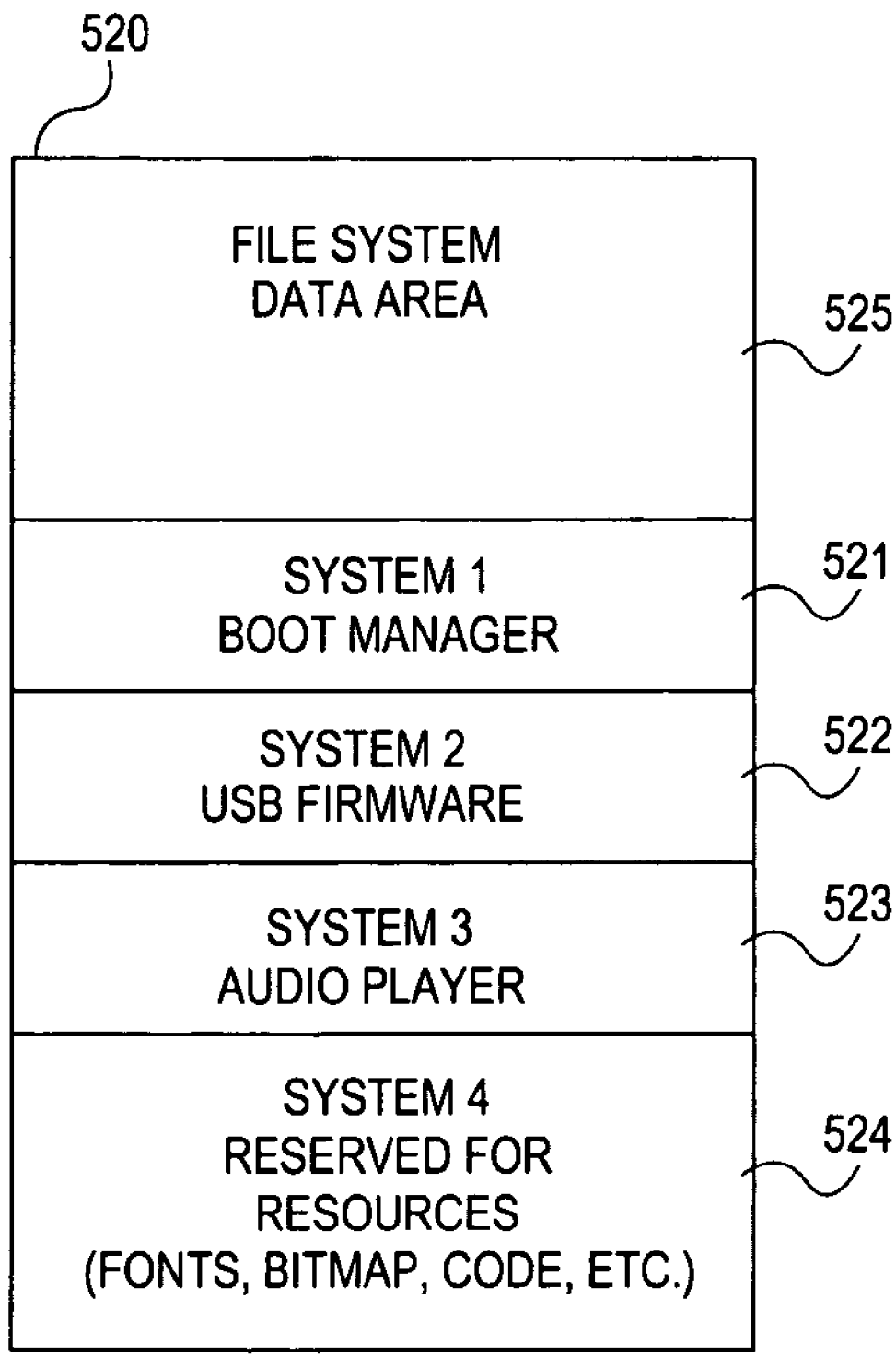
FIG. 30 is a diagram of a portion of the memory of FIG. 29 showing the storing of several boot routines.

The data storage area of the hidden block may now be used under specialized condition(s) by the system. In the particular embodiment, the boot routines are loaded into this hidden block. As shown in FIG. 30, a portion of hidden block 520 is shown comprised of four system-level routines, noted as Systems 1–4, as well as a memory space allocated to storing of a file system. In the example block 520, System 1 (block area 521) is a boot manager which manages how the integrated circuit 12 boots at initialization. System 2 (block area 522) is a USB firmware, which corresponds to the first operational mode described above for the device. System 3 (block area 523) is an audio player boot routine, which corresponds to one of the second operational mode of described above. In the particular example, System 4 (block area 524) is reserved for resources such as fonts, bit maps, codes, etc. The file system data area (block area 525) is utilized for storing file system data. The actual amount of memory space required or utilized for the spaces 521–525 may vary and depend on the size of the various routines.

Figure 31:
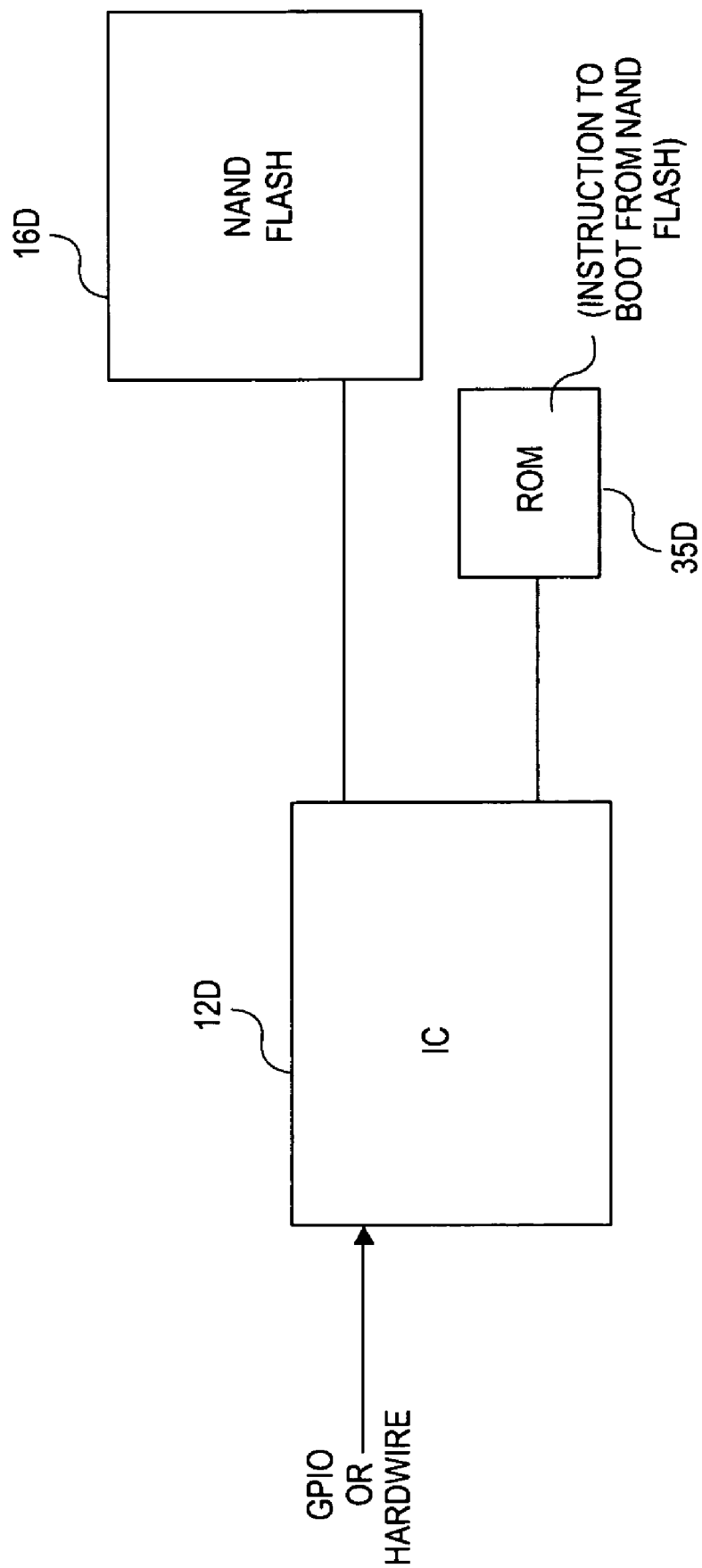
FIG. 31 is a block schematic diagram showing a use of a NAND flash memory to store a boot program which is used to boot an integrated circuit.
Figure 32:
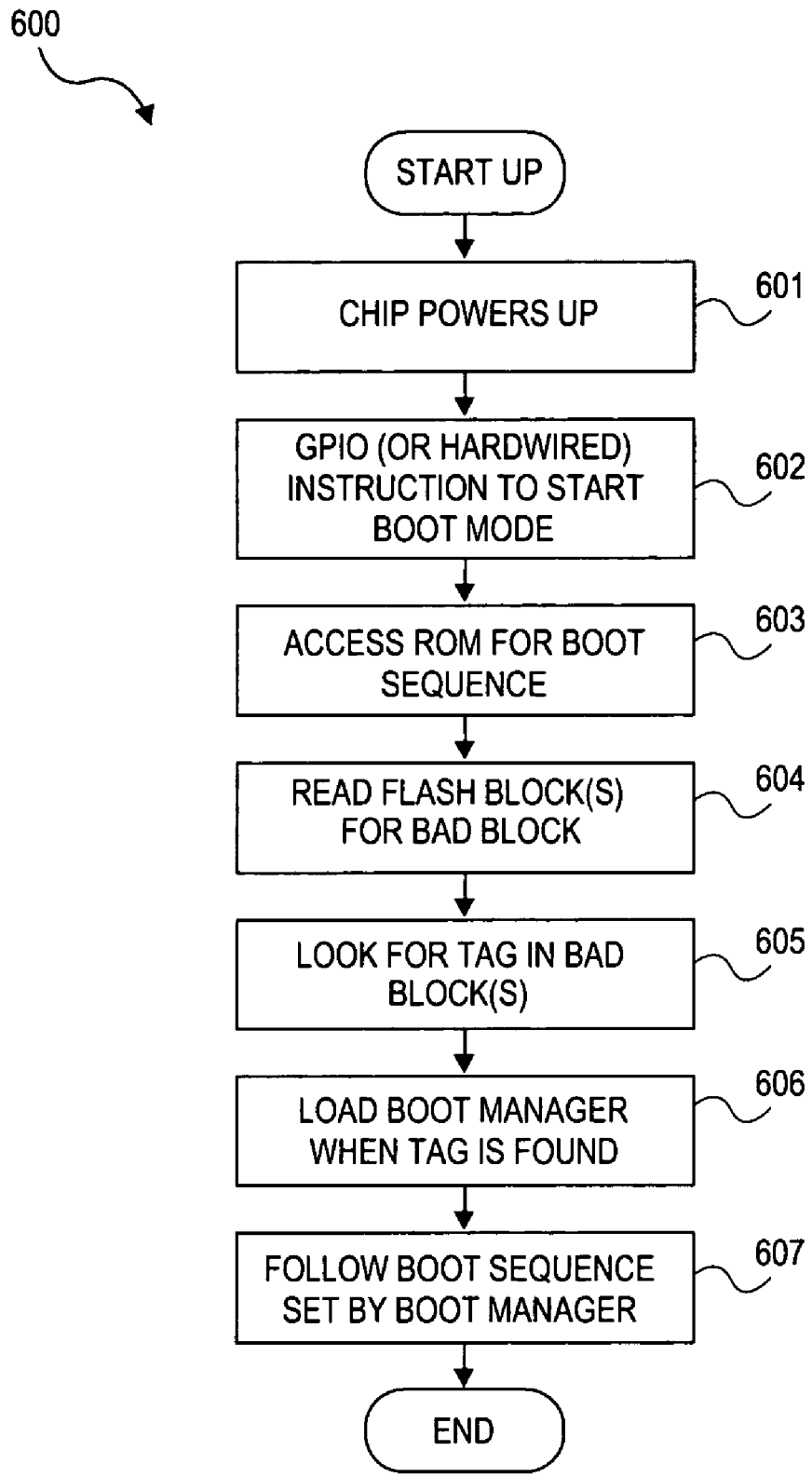
FIG. 32 is a flow diagram for booting the integrated circuit of FIG. 31.

FIG. 31 is a simplified diagram showing how the integrated circuit 12D operates to load from the external NAND flash 16D during a power up initialization sequence. The initialization of the integrated circuit 12D to retrieve the boot routine from the NAND flash 16D is shown in a flow diagram 600 of FIG. 32. When power is applied, the integrated circuit 12D powers up (block 601) and receives instruction as to how to start the boot mode from either a signal input from the GPIO (general purpose 10 input) or the signal may be hardwired as an input to the integrated circuit 12D. The hardwired code or the input through the GPIO instructs the integrated circuit 12D how to start the boot mode (block 602). In one embodiment, the boot command received by the integrated circuit 12D instructs the integrated circuit to access the ROM 35D for the boot sequence (block 603). When ROM 35D is accessed, an instruction is sent to the integrated circuit 12D to read every flash block and to identify those that are bad blocks (block 604). When a bad block(s) is/are identified, then the initialization instruction from the ROM causes the integrated circuit 12D to look for a tag in those identified bad blocks (block 605). When the unique tag is found in one of the bad blocks, that block is identified as the hidden block for containing the boot routines. Assuming that boot routines of FIG. 30 are resident in the hidden block, the integrated circuit 12D then loads the boot manager from System 1 of section 521 and follows the boot sequence set by the boot manager (block 607).

With one particular application of the boot routines of FIG. 30, the boot manager looks to determine if there is a USB connection to the device. If there is a USB connection, then the boot manager enters the first mode of operation as earlier described and looks to load the USB firmware by utilizing the routines stored in System 2 area 522. However, if there is no USB connection, then the boot manager defaults to loading the audio player boot routine resident in System 3 of area 523. One or more of the system routines in system area 521–523 may access those resources resident in system area 524 for execution of respective boot routines.

Thus, by designating one of the blocks as a hidden block, boot routines may be stored in a NAND type flash memory device, along with data which may be stored in the other blocks indicated as good. Since the boot routines are stored in a block indicated as a bad block (hidden block) general data access is not permitted into this area, so that boot routines may not be written over by other data. Furthermore, by putting the operating system program (boot routines) and data in the same physical medium, which is a NAND flash device in the example, both data and operating system programs may be placed on a single storage device. In addition, since the operating system programs are stored on a storage device typically utilized for data storage, a separate NOR type flash memory device may not be required to operate with the integrated circuit 12. Since the system knows that the particular hidden block contains the operating system program, customization of this area may be permitted to update the operating system program or to install different operating system program.

Furthermore, in other embodiments of the hand-held device, the NAND flash memory, which is noted as an external memory device, may be readily incorporated within the integrated circuit itself. Thus, in other embodiments, the integrated circuit 12 may include NAND flash memory, that may then store operating system program along with the data internally within integrated circuit 12D. For example, when the particular application is MP3, the NAND flash memory device may store both the operating system program in the hidden block, as well as audio data (such as music) in a single storage device, which may reside external to the integrated circuit 12 or retained internal in other embodiments. Accordingly, one type of memory device may then be employed for storage of both the operating system program and data. It is to be noted that other programs and instructions may be stored in a similar manner as the operating system programs described above. The memory need not be limited to NAND type flash memory.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The preceding discussion has presented a system-on-a-chip integrated circuit for use in a multi-function handheld device. As one of average skill in the art will appreciate, other embodiments may be derived from the teaching of the present invention, without deviating from the scope of the claims. Furthermore, some or all of the manipulative tasks performed by software programs may reside on a variety of media and the programs may be transferred by a variety of transmission means.

We claim:

1. A method comprising:
    storing data in a data oriented storage medium;
    storing an operating system program in the same storage medium as the data; and
    protecting the operating system program from being overwritten when data is written to the storage medium, wherein protecting the operating system program includes identifying a portion of the storage medium as bad, hut using a tag to identify that the bad portion of the storage medium is good and used to store the operating system program.

2. The method of claim 1, wherein the storing the data and operating system program are achieved on a NAND type flash memory device.

3. The method of claim 2, wherein protecting the operating system program is achieved by using a hidden memory block in the NAND type flash memory device to store the operating system program.

4. The method of claim 2, wherein protecting the operating system program includes identifying a hidden block as a bad memory block, but using a tag to identify that the bad memory block is a good block storing the operating system program.

5. A method comprising:
 accessing a storage device to identify a portion of the storage area as a bad area for storing data;
 determining if a specified tag identifying a presence of an operating system program is present; and
 loading the operating system program stored in the portion of the storage area identified as bad if the tag is present.

6. The method of claim 5, wherein loading the operating system program loads a boot routine which is used to boot a system.

7. The method of claim 6, wherein accessing a storage device accesses an external memory device to an integrated circuit to boot the integrated circuit.

8. The method of claim 7, wherein accessing a storage device accesses a NAND type flash memory device external to an integrated circuit to boot the integrated circuit.

9. A memory device comprising:
 a plurality of memory blocks utilized to store data;
 a hidden memory block used to store an operating system program instead of data, the hidden memory block designated as a bad block so that data will not be written into the hidden memory block; and
 a tag associated with the hidden memory block to identify that the hidden memory block contains the operating system program.

10. The memory device of claim 9, wherein the memory blocks, including the hidden memory block, are of NAND type flash memory.

11. The memory device of claim 10, wherein the operating system program is a boot routine to boot a system.

12. The memory device of claim 10, wherein the boot routine includes a boot manager and at least one other boot program.

13. A multi-function handheld device comprising:
 a system on a chip integrated circuit that includes an internal memory and a processor;
 a data oriented memory coupled external to the integrated circuit to operate as data storage medium for the integrated circuit, the data oriented memory including a hidden area to store an operating system program which boots the integrated circuit, wherein the operating system program is stored in the hidden area which is designated as a bad block, but a tag identifies the hidden area as a good block containing the operating system program.

14. The multi-function handheld device of claim 13, wherein the data oriented memory is a NAND type flash memory.

15. The multi-function handheld device 13 wherein the operating system program includes a boot manager and at least one other boot program.

16. The multi-function handheld device 13 wherein the operating system program includes a boot manager, Universal Serial Bus (USE) firmware and at least one other boot program, wherein at boot up of the integrated circuit, the boot manager boots the USE firmware if a USB connection is present, otherwise the at least one other boot program is booted.

* * * * *